United States Patent
Anton et al.

(10) Patent No.: US 9,015,238 B1
(45) Date of Patent: Apr. 21, 2015

(54) IMPLEMENTATION OF A WEB SCALE DATA FABRIC

(71) Applicant: State Farm Mutual Automobile Insurance Company, Bloomington, IL (US)

(72) Inventors: Alex Anton, Bloomington, IL (US); Tim G. Sanidas, Bloomington, IL (US); Jeff Perschall, Normal, IL (US); Michael Bernico, Bloomington, IL (US); Michael K. Cook, Carlock, IL (US); Lynn Calvo, Fayetteville, GA (US); V. Rao Kanneganti, Swedesboro, NJ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 14/485,182

(22) Filed: Sep. 12, 2014

Related U.S. Application Data

(63) Continuation of application No. 14/201,325, filed on Mar. 7, 2014.

(60) Provisional application No. 61/800,561, filed on Mar. 15, 2013.

(51) Int. Cl.
 *G06F 15/16* (2006.01)
 *G06F 17/30* (2006.01)
 (Continued)

(52) U.S. Cl.
 CPC ...... *G06F 17/30073* (2013.01); *H04L 67/1097* (2013.01)

(58) Field of Classification Search
 CPC ............ G06F 9/5072; G06F 17/30424; G06F 9/45558; G06F 9/5066; G06F 17/30194; G06F 19/322; G06F 8/61; G06F 9/5061; G06F 9/546; G06F 11/0766; G06F 11/0775; G06F 11/1482; G06F 11/30; G06F 11/323
 USPC ......... 709/203, 217–218, 206–207, 223–229, 709/250
 See application file for complete search history.

(56) References Cited

U.S. PATENT DOCUMENTS

| | | | |
|---|---|---|---|
| 5,950,169 A | | 9/1999 | Borghesi et al. |
| 6,141,686 A | * | 10/2000 | Jackowski et al. ............ 709/224 |

(Continued)

OTHER PUBLICATIONS

Aiyagari, Sanjay et al. AMQP Advanced Message Queuing Protocol Specification. Version Dec. 9, 2006. https://www.rabbitmq.com/resources/specs/amqp0-9.

(Continued)

*Primary Examiner* — Zarni Maung
(74) *Attorney, Agent, or Firm* — Marshall, Gerstein & Borun LLP; Randall G. Rueth

(57) ABSTRACT

Methods and systems for processing machine accelerated and augmented customer data using a Web-Scale Data Fabric (WSDF). According to embodiments, the data may be received as data transfer objects from a set of business operations client applications. The data transfer objects may be analyzed using complex event processing (CEP) and, based on the analyzing, rules specific to the business operations client application may be applied. The methods and systems may semantically classify text specific to the business operations client application. A federated database (FD) may archive the receive data transfer objects as well as analysis data specific to the business operations client application.

20 Claims, 13 Drawing Sheets

(51) Int. Cl.
*H04L 29/08* (2006.01)
*G06F 12/00* (2006.01)

(56) References Cited

U.S. PATENT DOCUMENTS

| | | | |
|---|---|---|---|
| 7,739,133 | B1 | 6/2010 | Hail et al. |
| 7,937,437 | B2 | 5/2011 | Fujii |
| 7,958,184 | B2 | 6/2011 | Barsness et al. |
| 8,103,527 | B1 | 1/2012 | Lasalle et al. |
| 8,782,395 | B1 | 7/2014 | Ly |
| 8,813,065 | B2 * | 8/2014 | Zygmuntowicz et al. .... 717/174 |
| 2003/0078816 | A1 | 4/2003 | Filep |
| 2003/0182441 | A1 * | 9/2003 | Andrew et al. ............... 709/237 |
| 2004/0181621 | A1 * | 9/2004 | Mathur et al. .................. 710/52 |
| 2006/0111874 | A1 | 5/2006 | Curtis et al. |
| 2007/0100669 | A1 | 5/2007 | Wargin et al. |
| 2007/0214023 | A1 | 9/2007 | Mathai et al. |
| 2007/0282639 | A1 | 12/2007 | Leszuk et al. |
| 2008/0140857 | A1 | 6/2008 | Conner et al. |
| 2009/0031175 | A1 | 1/2009 | Aggarwal et al. |
| 2009/0240531 | A1 | 9/2009 | Hilborn |
| 2009/0287509 | A1 | 11/2009 | Basak et al. |
| 2010/0049552 | A1 | 2/2010 | Fini et al. |
| 2010/0274590 | A1 | 10/2010 | Compangano et al. |
| 2010/0299162 | A1 | 11/2010 | Kwan |
| 2011/0295624 | A1 | 12/2011 | Chapin et al. |
| 2012/0096149 | A1 | 4/2012 | Sunkara et al. |
| 2012/0143634 | A1 | 6/2012 | Beyda et al. |
| 2012/0311614 | A1 | 12/2012 | Deanna et al. |
| 2013/0018936 | A1 | 1/2013 | D'Amico et al. |
| 2013/0055060 | A1 | 2/2013 | Folsom et al. |
| 2013/0185716 | A1 | 7/2013 | Yin et al. |
| 2013/0226623 | A1 | 8/2013 | Diana et al. |
| 2013/0253961 | A1 | 9/2013 | Feldman et al. |
| 2014/0040343 | A1 | 2/2014 | Nickolov et al. |
| 2014/0089156 | A1 * | 3/2014 | Williams et al. ................ 705/35 |
| 2014/0089990 | A1 | 3/2014 | van Deventer et al. |
| 2014/0149485 | A1 * | 5/2014 | Sharma et al. ................ 709/202 |
| 2014/0278573 | A1 * | 9/2014 | Cook ................................ 705/4 |

OTHER PUBLICATIONS

Alexis Richardson, "Introduction to RabbittMQ, An Open Source Message Broker That Just Works," *Rabbit MQ, Open Source Enterprise Messaging*, pp. 1-36, May 13, 2009.
AMQP is the Internet Protocol for Business Messaging Website. Jul. 4, 2011. https://web.archive.org/web/20110704212632/http://www.amqp.org/about/what.
Brian Hopkins, "Big Opportunities in Big Data Positioning Your Firm to Capitalize in a Sea of Information," *Enterprise Architecture Professionals, Forrester Research, Inc.*, pp. 1-9, May 18, 2011.
Cloudera.com, "Deploying MapReduce v2 (YARN) on a Cluster." Retrieved from the Internet on Jun. 10, 2014: http://www.cloudera.com/content/cloudera-content/cloudera-docs/CDH4/4.2.0/CDH4-Installation-Guide/cdh4ig_topic_11_4.html.
Cloudera.com, "Hadoop and Big Data," (2014). Retrieved from the Internet on Jun. 10, 2014: http://www.cloudera.com/content/cloudera/en/about/hadoop-and-big-data.html.
Cloudera.com, "Migrating from MapReduce v1 (MRv1) to MapReduce v2 (MRv2, YARN)," (2014). Retrieved from the Internet on Jun. 10, 2014: http://www.cloudera.com/content/cloudera-content/cloudera-docs/CDH5/latest/CDH5-Installation-Guide/cdh5ig_mapreduce_to_yarn_migrate.html?scroll=concept_b2p_rmy_xl_unique_2.
Cloudera.com, Migrating from MapReduce v1 (MRv1) to MapReduce v2 (MRv2, YARN).
Corbett et al. "Spanner: Google's Globally-Distributed Database," Google, Inc. (2012), pg. 1-14.
Corbett et al., "Spanner: Google's Globally-Distributed Database," *Google, Inc.*, pp. 1-14, 2012.
Das et al., "Ricardo: Integrating R and Hadoop," *University of California* pp. 987-998.
Dean et al., "A New Age of Data Mining in the High-Performance World," *SAS Institute Inc.*, 2012.
Evelson et al., "Search + BI = Unified Information Access," *Information & Knowledge Management Professionals, Forrester Research, Inc.*, pp. 1-17, May 5, 2008.
Fong et al. Toward a scale-out data-management middleware for low-latency enterprise computing. IBM J. Res. & Dev. vol. 57 No. 3/4 Paper 6 May/Jul. 2013.
Graves, Steven. 101: An Introduction to In-Memory Database Systems. Jan. 5, 2012. http://www.low-latency.com/article/101-introduction-memory-database-systems.
Leslie Owens, "Tapping the Power of Search-Based Application," *Content & Collaboration Professionals, Forrester Research, Inc.*, pp. 1-13, Mar. 14, 2011.
Leslie Owens, "Text Analytics Takes Business Insight to New Depths", *Information & Knowledge Management Professionals, Forrester Research Inc.*, pp. 1-13, Oct. 22, 2009.
McKeown et al., "OpenFlow: Enabling Innovation in Campus Networks," pp. 1-6, Mar. 14, 2008.
Melnik et al., Dremel: Interactive Analysis of Web-Scale Datasets, Google Inc., pp. 1-10.
Nyse Technologies Website and Fact Sheet for Data Fabric 6.0 Aug. 2011. http://web.archive.org/web/20110823124532/http://nysetechnologies.nyx.com/data-technology/data-fabric-6-0.
Paul Miller, "Scaling Hadoop clusters: the role of cluster management," *StackIQ*, pp. 1-17, Jul. 2012.
Stefan Theuβ1, "Applied High Performance Computing Using R," *Diploma Thesis, Univ. Prof, Dipl, Ing. Dr. Kurt Hornik*, pp. 1-126, Sep. 27, 2007.
Wang et al., "Kepler + Hadoop: A General Architecture Facilitating Data-Intensive Applications in Scientific Workflow Systems," *San Diego Supercomputer Center*, pp. 1-8.
Wang et al., "Programming Your Network at Run-time for Big Data Applications," *IBM T.J. Watson Research Center, Rice University*, pp. 103-108.
Webb et al., "Topology Switching for Data Center Networks," UC San Diego, pp. 1-6.
Xi et al., "Enabling Flow-based Routing Control in Data Center Networks using Probe and ECMP," Polytechnic Institute of New York University, IEEE INFOCOM 2011, pp. 614-619.

* cited by examiner

IMPLEMENTATION OF A WEB SCALE DATA FABRIC

CROSS-REFERENCE TO RELATED APPLICATIONS

The present application is a continuation of U.S. patent application Ser. No. 14/201,325, which was filed on Mar. 7, 2014, and claims the benefit of U.S. Provisional Application No. 61/800,561, which was filed on Mar. 15, 2013, which is incorporated by reference herein in its entirety.

FIELD OF THE DISCLOSURE

The present disclosure relates to systems and methods for processing, storing, and accessing "big data," and, more particularly, to platforms and techniques for processing business operations transactions and associated augmented customer data using a big data architecture.

BACKGROUND

The increasing usage of the Internet by individual users, companies, and other entities, as well as the general increase of available data, has resulted in a collection of data sets that is both large and complex. In particular, the increased prevalence and usage of mobile devices, sensors, software logs, cameras, microphones, radio-frequency identification (RFID) readers, and wireless networks have led to an increase in available data sets. This collection of data sets is often referred to as "big data." Because of the size of the big data, existing database management systems and data processing applications are not able to adequately curate, capture, search, store, share, transfer, visualize, or otherwise analyze the big data. Theoretical solutions for big data processing require hardware servers on the order of thousands to adequately process big data, which would result in massive costs and resources for companies and other entities.

Companies, corporations, and the like are starting to feel the pressure to effectively and efficiently process big data. In some cases, users are more often expecting instantaneous access to various information resulting from big data analyses. In other cases, companies feel the need to implement big data processing systems in an attempt to gain an edge on their competitors, as big data analyses can be beneficial to optimizing existing business systems or products as well as implementing new business systems or products. For example, there is a need for insurance providers to analyze big data in an effort to create new insurance products and policies, refine existing insurance products and policies, more accurately price insurance products and policies, process insurance claims, and generally gather more "intelligence" that can ultimately result in lower costs for customers.

Accordingly, there is an opportunity to implement systems and methods for processing big data.

SUMMARY

One embodiment of the techniques discussed herein relates to a system for processing business operations transactions and associated augmented customer data. The system comprises a plurality of computer servers interconnected with a software defined network (SDN) via a plurality of network switches, controllers, and network interfaces, and facilitated by an operating system (OS) comprising a network operating system (NOS), a distributed file system (DFS), a grid node operating system (GNOS), and a resource negotiator (RN), the plurality of computer servers configured for economical large scale computation and data storage with resilience despite underpinning commodity hardware failure and grow-shrink capacity changes of nodes and associated interconnectivity. The plurality of computer servers are configured to implement commodity hardware for economy measured by ownership cost, and perform computation and store data within the computer grid. The system further comprises direct attached storage (DAS) comprising just a bunch of disks (JBOD) configured for storage economy measured in total cost of ownership, random access memory (RAM) coupled to the DAS to provide storage capacity for the plurality of computer servers, a central processing unit (CPU), and a co-processor coupled to the CPU to provide computation capacity for the plurality of computer servers. According to the embodiment, the SDN is configured to connect to an external computer network (ECN) for external client input and output, the NOS and the RN are configured to interface with the SDN to perform a physical-to-virtual network connectivity mapping between the plurality of computer servers and the ECN for negotiated bandwidth and latency conducive to at least one of computation, data receipt, and storage. Further, the DFS and the GNOS are configured to interface with the plurality of computer servers to maintain resilient storage of data received from the ECN or computationally derived from the received data, the RN and the GNOS are configured to interface with the plurality of computer servers to perform physical-to-virtual parallel computation with negotiated computational capacity on data that is stored on the DAS or cached in the RAM, and the DFS is configured to implement a distributed file system (DFS). Additionally, the NOS is configured to facilitate physical-to-virtual network connectivity with managed bandwidth and latency, and the RN is configured to implement a resource-management platform.

Another embodiment of the techniques discussed herein relates to a method of stream processing machine accelerated and augmented customer data. The method comprises receiving, as data transfer objects, machine accelerated and augmented customer data from one or more business operations client applications via an external computer network, wherein the data transfer objects are (1) received by a message broker component and (2) implemented as an AMQP message with a data transfer object as a payload. The method further comprises analyzing the received data transfer objects using a complex event processor (CEP) configured to inspect at least one attribute of the received data transfer objects for a given window of time, and based on the analyzing, detecting at least one event and applying at least one rule that is specific to business operations client application processing. Additionally, the method comprises semantically classifying text in the received data transfer objects that is specific to the business operations client application processing, archiving the received data transfer objects in a federated database (FD), and routing analysis data that is specific to the business operations client application processing to the FD for archiving.

DETAILED DESCRIPTION

Figure 1:
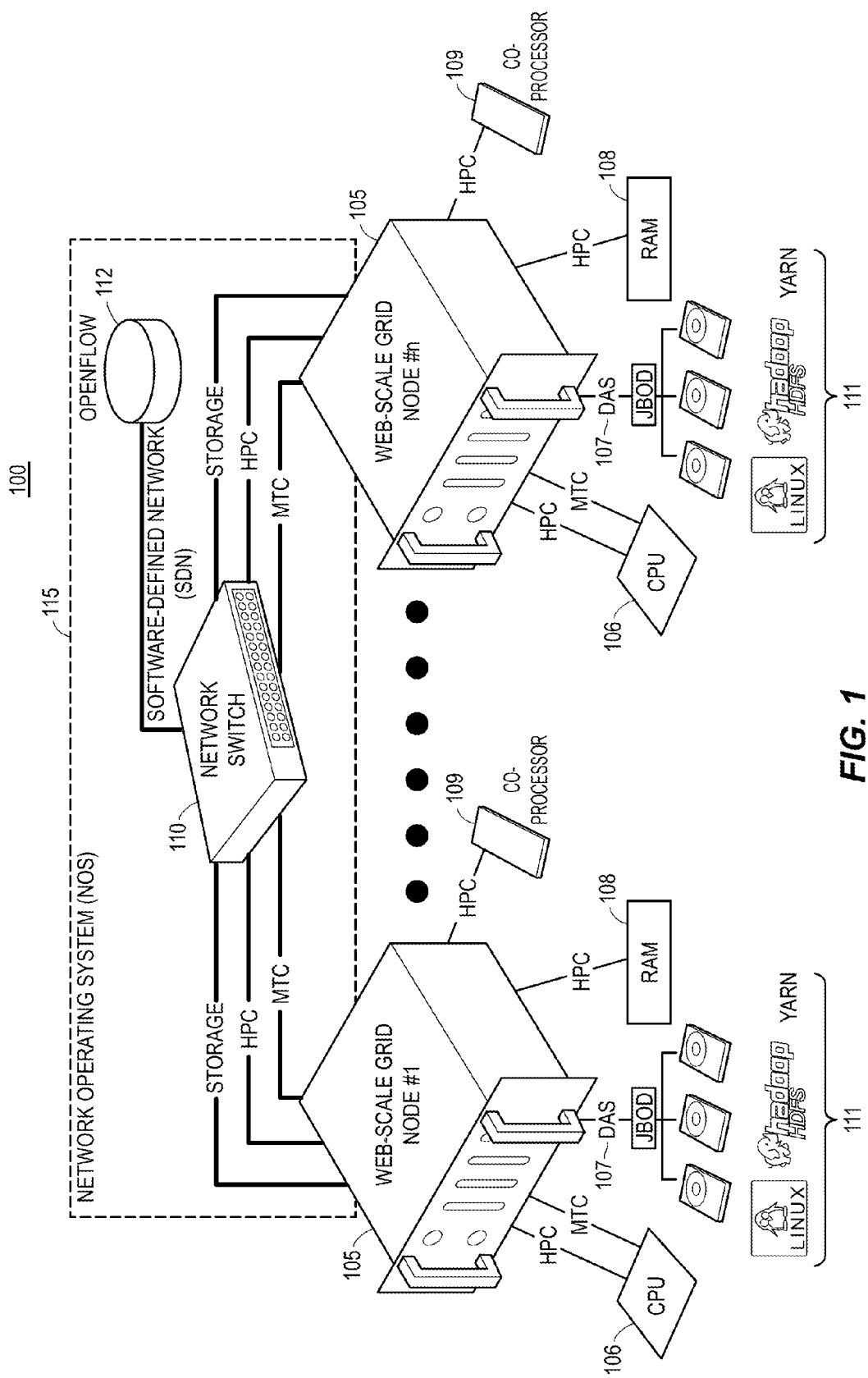
FIG. 1 is a block diagram of an exemplary web-scale grid on which a web-scale data processing method may operate in accordance with some embodiments.

Many companies, corporations, firms, and other entities, including large software vendors, are investing heavily in improved technologies to capitalize on the potential value of processing and analyzing large data sets commonly referred to as "big data." In general, processing big data may be accomplished in one of two ways. The first way seeks to supplement present relational database and data movement technologies with Web-proven technologies such as Apache™ Hadoop®. The second seeks to adopt an approach that various Web companies have with non-relational databases, along with implementing processing that moves function-to-data on commodity hardware and open source software. The lure of the first approach is that companies can depend on large software vendors and familiar technologies to evolve toward web-scale processing. The lure of the second approach is that it can be scaled and is more economical than current relational database or data movement technology techniques.

Hands-on experimentation with these "big data" technologies indicates that the second, Web company approach appears viable and shows the promise of economic benefit in hardware as well as in software development for both operational and analytical solutions. In terms of hardware, a grid of commodity hardware, not much different from desktop PCs, can be architected to address computational storage and network applications necessary to achieve data processing at web-scale. In terms of software development, non-relational databases offer less complex data structure. Additionally, function-to-data processing avoids data movement complexity which can translate to reduced development time and cost.

Web companies have also proven that data center networking requirements can be achieved with commodity hardware. In particular, the use of software-defined networking (SDN) associated with the OpenFlow communications protocol can be used to isolate network traffic. Further, an application of an Intel® coprocessor can enable high performance computing.

The Intel® coprocessor, for example the Xeon Phi™ coprocessor, holds the promise of reducing software development complexity for high performance computing relative to real-time processing solutions. SDN can be used in combination with the coprocessor in cases in which the SDN isolates network traffic resulting from high performance computing from other, non-high performance computing network traffic. These additional gains in network and coprocessor technologies can also translate into data center power savings.

Generally, function-to-data processing can be employed in non-relational databases and in-database processing can be employed in relational databases. Various hands-on research indicates that business intelligence vendors are introducing function-to-data processing on technologies such as Apache™ HBase™ and Apache™ Hadoop®. These advancements can efficiently and effectively bring big data capabilities within reach of business partners.

Hands-on experimentation also demonstrates that the combination of search technologies and search-based applications on multi-structured data in non-relational databases provides a similar user experience to that of, for example, a Google® search on the Web. Multi-structured data can be a combination of unstructured, semi-structured, and structured data. These function-to-data and search advancements can enable business users to easily and economically access big data.

The embodiments and portions of exemplary embodiments as discussed herein are collectively referred to as the Web-Scale Data Fabric (WSDF). Although the embodiments as discussed herein are related to processing insurance data, it should be appreciated that the WSDF can be employed across other industries and their verticals such as, for example, finance, technology, healthcare, consulting, professional services, and/or the like.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, insurance policy may be in-force, e.g., the policyholder is enrolled.

It should be appreciated that the configurations of the hardware components as illustrated in FIGS. 1-8 are merely exemplary and can include different combinations and aggregations of components. For example, the data nodes, application cache nodes, access nodes, and index nodes and any software associated therewith as depicted in some or all of FIGS. 1-8 may be combined into one or more hardware components to perform the functionalities as described herein. It should be appreciated that other combinations of components are envisioned.

Section 1

Web-Scale Grid

Referring now to FIG. 1, a configuration design 100 that depicts the core of the WSDF implementing an elastic platform or "Grid." This Grid is composed of a plurality of nodes (1-n) (105) that can be networked through software-defined connectivity. According to embodiments, "elastic" refers to the ability to add or remove nodes 105 within the Grid to accommodate capacity requirements and/or failure replacement. Although only two nodes 105 are depicted in FIG. 1, it should be appreciated that other amounts of nodes 105 are envisioned.

In embodiments, each node 105 can be designed to be equipped with a mid-range multi-core central processing unit (CPU) 106, direct-attached storage (DAS) 107 consisting of a set of drives sometimes referred to as "just a bunch of disks" (JBOD), random access memory (RAM) 108, and one or more coprocessor cards 109. The precise configuration of each node 105 can depend on its purpose for addressing web-scale requirements. Networking between nodes 105 is enabled with a networking device (such as a network switch 110 as shown in FIG. 1) where connectivity can be defined with software. The precise configuration of network connectivity depends on the purpose for addressing web-scale requirements.

For each node 105 to operate on the Grid, a stack of software 111 may be advantageous. In embodiments, the software stack 111 is designed to provide the kernel or operating system for the Grid. According to embodiments, the software stack 111 can be configured to include Linux 2.6+ 64 bit framework, the Hadoop® 2.0+ framework, and/or other frameworks. The precise stack configuration for each node 105 depends on the purpose for addressing web-scale requirements. It should be appreciated that the software stack 111 can include other frameworks or combinations of frameworks.

The combination of the mid-range multi-core CPU 106, the coprocessor card 109, the RAM 108, and a software-defined network (SDN) 112 can provide the computational capabilities for the Grid. It should be appreciated that additional coprocessor cards 109 and/or nodes 105 can enable additional computing scale. In some configurations, this computational design can be a hybrid of high-performance computing (HPC) and many-task computing (MTC) grids. In some embodiments, the Apache™ Hadoop® YARN sub-project can enable the coexistence of HPC and MTC computation types within the same Grid.

This hybrid design can be further enhanced through the use of the SDN 112 as well as a mid-range multi-core CPU. According to embodiments, the SDN 112 can be used to isolate the network connectivity requirements for computation types from other competing network traffic. It is expected that this configuration may facilitate lower cost computing and network connectivity, along with lower power demands per flop.

The DAS 107 on each of the nodes 105 can be made available through the Apache™ Hadoop® Distributed File System (HDFS), combined with the SDN 112, to provide the storage capabilities for the Grid. Additional drives and/or nodes with drives can enable additional storage scale. The SDN 112 can be used to isolate the network connectivity requirements for storage from other competing network traffic. It is expected that this configuration or configurations similar thereto can facilitate lower cost network connectivity associated with storage per gigabyte.

The network devices used within the Grid are designed for operation using the OpenFlow protocol. OpenFlow combined with the SDN 112 can be referred to herein as a Network Operating System (NOS) 115. It is expected that this configuration of the NOS 115 can facilitate lower cost network devices and lower power demands.

In general, it should be appreciated that the web-scale Grid uses the SDN 112 to manage connectivity and uses the coprocessor 109 accelerator for distributed parallel computation. In particular, the CPU 106 can be used in combination with the coprocessor 109 for horizontal and vertical scaling to provide distributed parallel computation. Similarly, the web-scale Grid can facilitate storage using both DAS and RAM, whereby the combination of the coprocessor 109 and the storage enables the Grid to achieve web-scale.

Section 2

Web-Scale Federated Database

Figure 2:
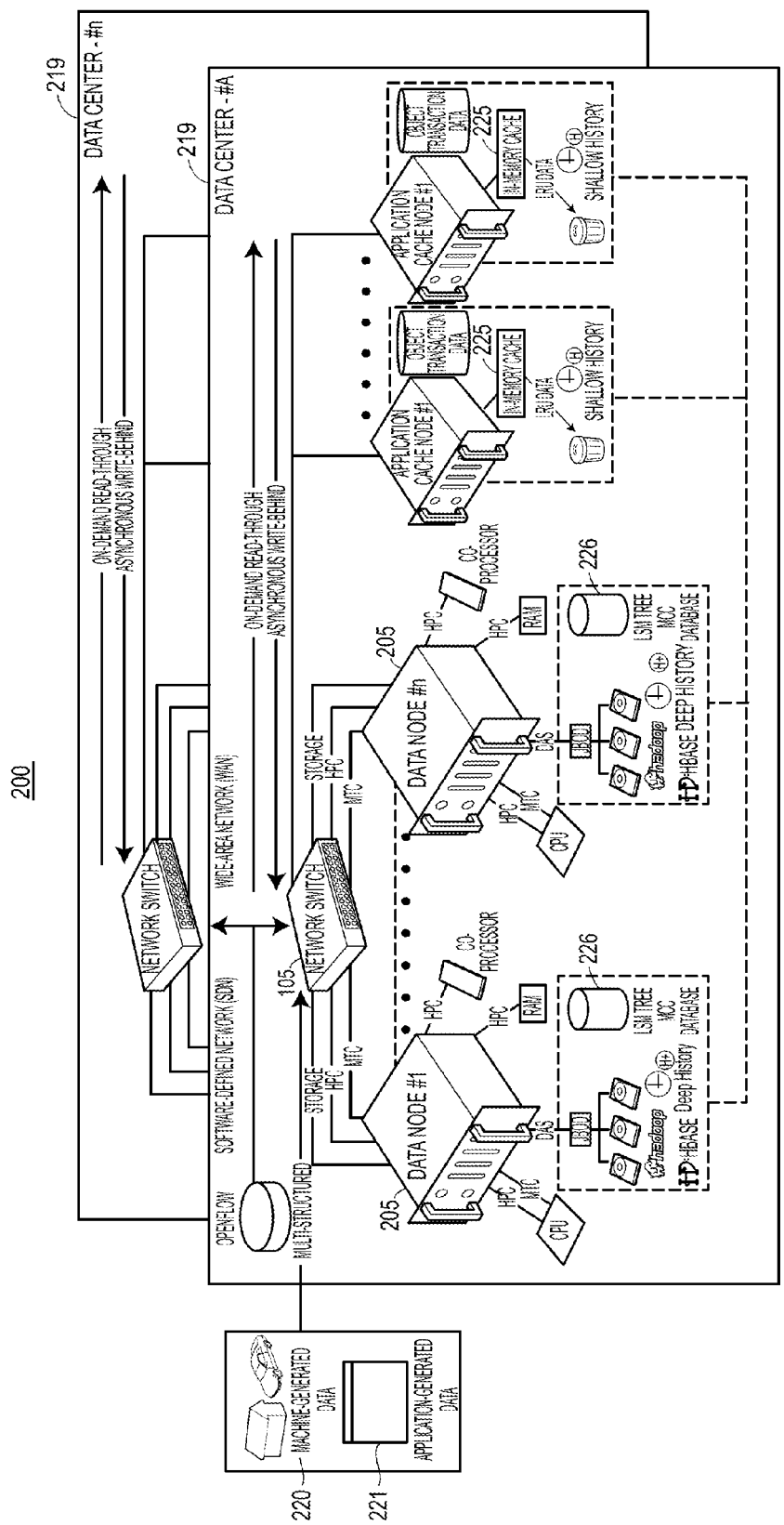
FIG. 2 is a block diagram of an exemplary web-scale federated database on which a web-scale data storage method may operate in accordance with some embodiments.

Referring now to FIG. 2, a federated database design 200 is deployed on the web-scale grid as discussed with respect to FIG. 1. According to embodiments, the federated database can be designed and configured for storage of transactions with low latency. From a hardware perspective, there are several nodes configured to store various data and several nodes configured to implement an in-memory cache. The number of nodes can be directly related to the scalability requirements for storage or low latency data ingestion.

One or more in-memory caches 225 can be designed and configured for distribution across one or more various data centers 219, thus enabling a distributed cache. By spanning data centers across a wide area network (WAN), the Grid can be positioned for high availability despite a disaster or disruption within any given data center 219. In particular, object transaction data that originates from either machine sources 220 (such as a home or automobile) or applications 221 is stored within the in-memory cache 225 before being asynchronously relayed and replicated using data transfer objects (DTO) to a log-structured merge-tree (LSM-tree) database 226 within each data center 219. Apache™ HBase™ is an example of a LSM-tree database. According to embodiments, the in-memory cache 225 plus the LSM-tree database 226 per data center 219 can comprise the federated database. In some embodiments, the LSM-tree databases 226 can be optimized for throughput to support low latency data ingestion.

DTOs can be enhanced with a timestamp as they are relayed to the LSM-tree databases 226 in each data center 219. The timestamp combined with a globally unique identifier (GUID) for the corresponding DTO can provide the basis for a multi-version concurrency control dataset (MCC). Transactions are stored with the MCC where each change to the DTO is appended. The resulting transaction history facilitates a point-in-time rollback of any given object transaction. In some embodiments, the internal MCC data design is independent of the type of database, thus enabling portability across other LSM-tree databases.

Storage of data in the LSM-tree databases 226 can be designed and configured such that object transaction data can be range-partitioned for distribution across the apportioned Grid nodes. This range partitioning can be based on the GUID and timestamp key concatenation. Each object transaction can also be designed for optimized storage, with or without encoding. For implementations utilizing HBase™, the column family and column descriptor can be encoded. In some cases, codes, descriptions, and other metadata such as data type and length can be stored separately in a cross-reference table. The object transaction or DTO can then be (de)serialized and mapped into LSM-tree database data types. For implementations using HBase™, the DTO can be (de)serialized into a tuple where each column can be represented in byte arrays.

As transactional data is accessed, the in-memory cache 225 can be designed and configured to evict the least recently used (LRU) data. When a transaction is requested by an application using a given GUID and that transaction is no longer in cache, the in-memory cache 225 can be designed to perform an on-demand read-through from the LSM-tree database 226, with an affinity toward the database within the same data center 219 (if available).

As object transactions are atomically persisted within the in-memory cache 225, they can be replicated across the data centers 219. The federated database design pattern can take advantage of eventual consistency to provide availability that spans multiple data centers without being dependent on database log-based replication.

In addition to the storage of transactions described above, the federated database design 200 can also provide storage for multi-structured data ingested through streaming. See the Web-Scale Stream Processor (Section 3) for additional details regarding this implementation.

According to embodiments, the web-scale federated database design 200 utilizes an in-memory key value object cache in concert with the LSM-tree databases 226 for low latency transaction ingestion with consistency in cache to eventual consistency among the LSM-tree databases 226 across the data centers 219. In addition, the web-scale federated database design 200 utilizes MCC on multi-structured data for "discovery-friendly" analytics with positioning for automated storage optimization.

Section 3

Web-Scale Stream Processor

Figure 3:
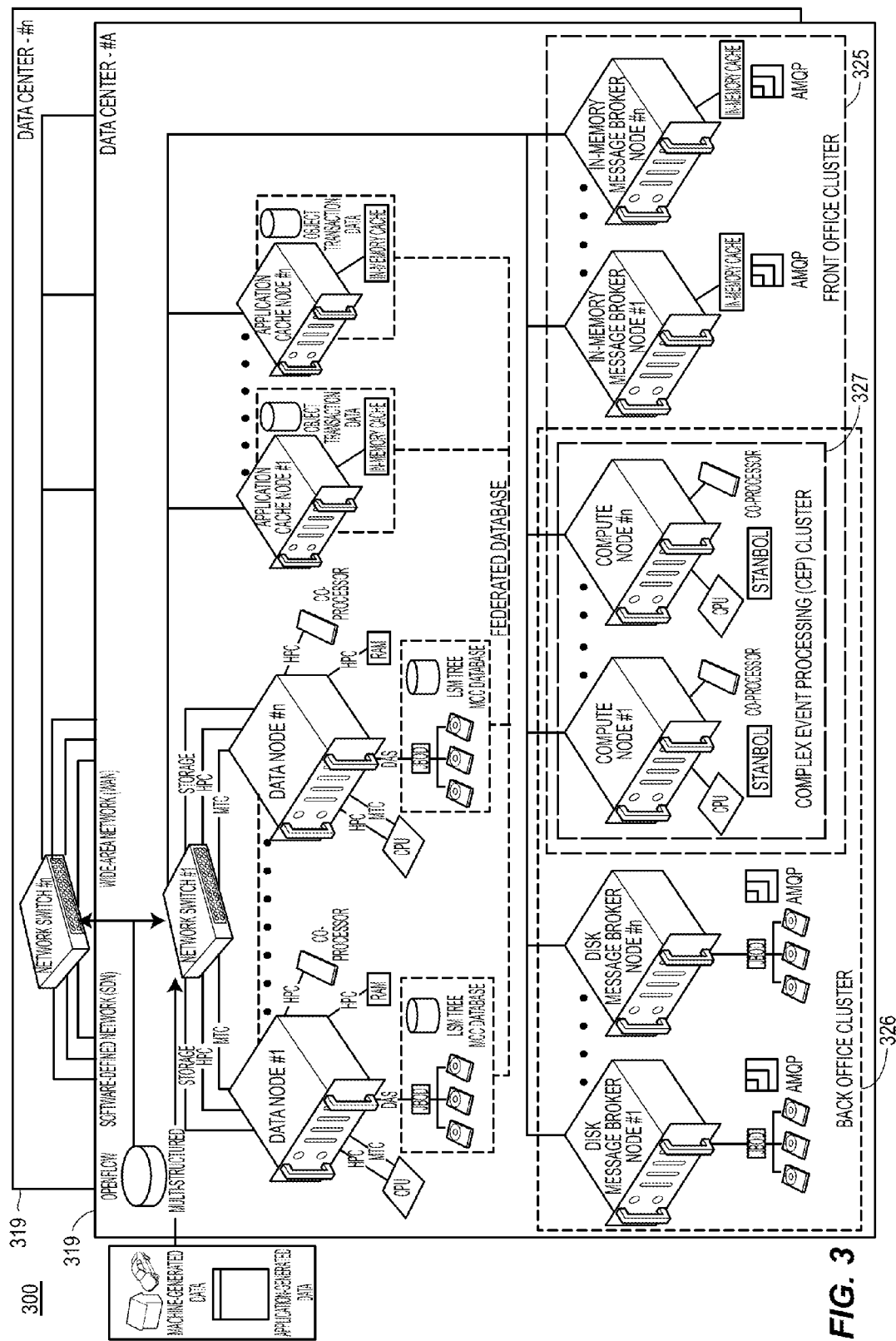
FIG. 3 is a block diagram of an exemplary web-scale stream processor on which a web-scale data storage stream processing method may operate in accordance with some embodiments.

Referring now to FIG. 3, an extension to both the Web-Scale Grid (Section 1) and the Web-Scale Federated Database (Section 2) is a stream processor implementation 300. According to embodiments, the stream processor implementation 300 is designed and configured to ingest and process multi-structured data in-stream with low latency through messaging. To enable the stream processor implementation 300 from a hardware perspective, several nodes can be leveraged with memory (for processing) and combined with storage (for high availability). In particular, nodes can be grouped into clusters with a design configuration that federates clusters across data centers 319 to manage capacity while addressing availability in case of disaster at any of the data centers 319.

For the stream processor implementation 300 to facilitate processing of data, the design utilizes the advanced message queuing protocol (AMQP) open standard. According to embodiments, AMQP enables interoperability as well as support for the ingestion of multi-structured data.

According to embodiments, messages are ingested through AMQP brokers hosted on federated clusters of the web-scale grid nodes. In particular, two types of clusters are used: a front office cluster 325 and a back office cluster 326. The front office cluster 325 can address low latency ingestion and processing facilitated primarily with RAM. The back office cluster 326 can address processing with less demanding latency facilitated primarily with DAS. One of each cluster type is enabled within the corresponding data center 319. Messages ingested with the front office cluster 325 are published to all back office clusters 326 within each data center 319 to enable high availability in case of disaster.

In some embodiments, messages can be processed by consumers that subscribe to queues. For example, for complex event processing (CEP), consumers are designed to work with an in-memory distributed cache. Referring to FIG. 3, the CEP functionalities may be implemented by the CEP cluster 327. This in-memory distributed cache used within the stream processor implementation 300 is shared with the web-scale federated database. When working with in-memory cache, data can be accessed using continuous query processing to determine occurrences of predefined events.

CEP is also designed to work with semantic processing software for classifying unstructured data in messages. That classification is subsequently published to another queue for further processing. An example of semantic classification software is Apache™ Stanbol™

The stream processing implementation 300 is further configured to store messages on the web-scale federated database. In some embodiments, the message storing functionality can be also addressed with consumers on queues associated with the back office cluster 326. These consumers are designed to operate in batch through a scheduler compatible with the web-scale federated database. An example scheduler could be Hadoop® YARN.

The stream processor implementation 300 is further designed to amass ingested messages for independent subsequent processing while providing interoperability and extensibility through open messaging for multi-structured data. The stream processor implementation 300 can use in-memory cache in concert with AMQP messaging for low latency CEP. CEP is also designed to work with semantic processing software for classifying unstructured data in messages.

Section 4

Web-Scale Data-Local Processor

Figure 4:
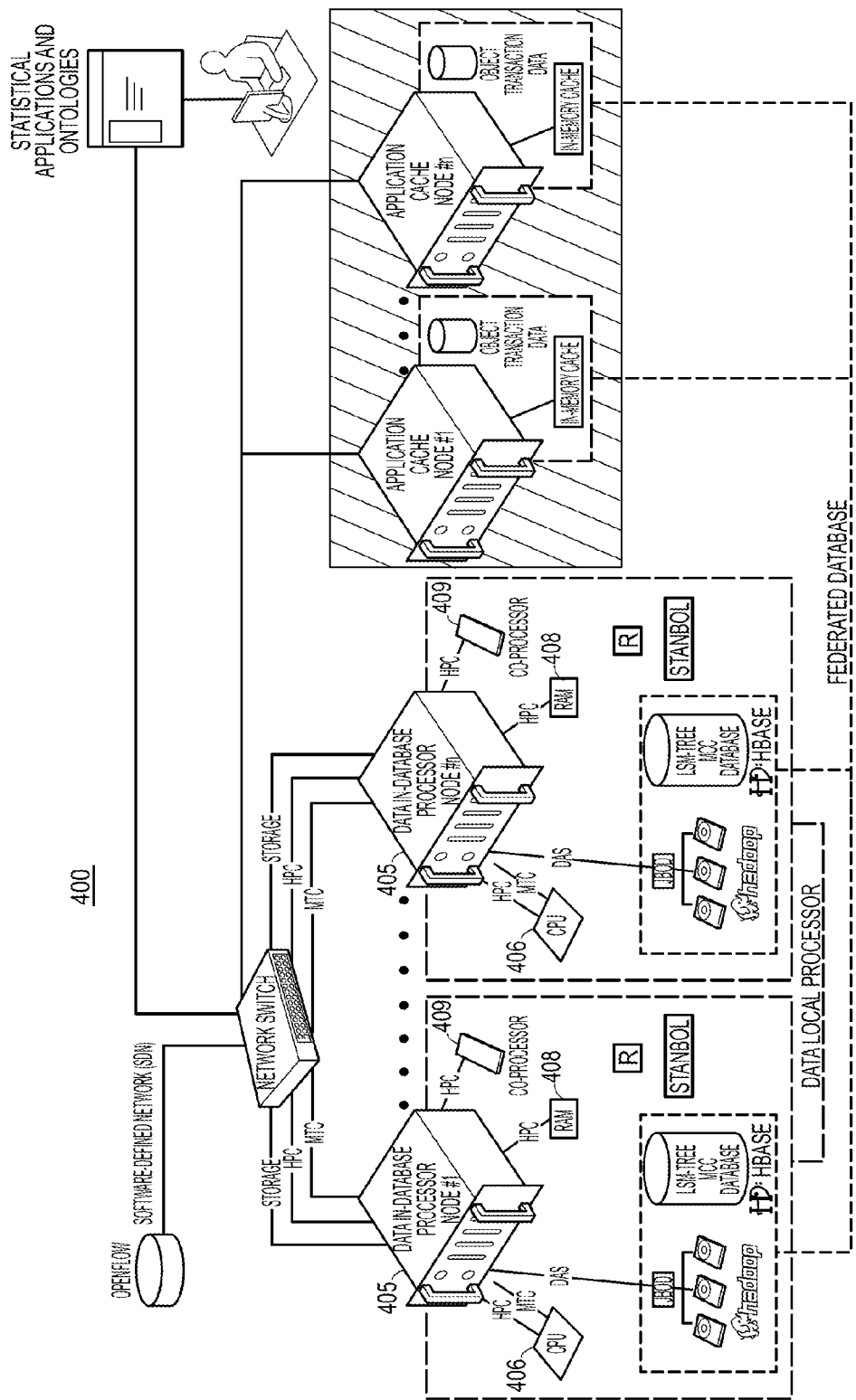
FIG. 4 is a block diagram of an exemplary web-scale data-local processor on which a web-scale data-local processing method may operate in accordance with some embodiments.

Referring now to FIG. 4, an implementation 400 includes the web-scale grid as discussed with respect to Section 1 deployed on the web-scale federated database as discussed with respect to Section 2. The data-local processor is designed to enable concurrent, distributed, and parallel computation of the data residing on web-scale grid nodes (as discussed with respect to Section 1), through use of common statistical and semantic classification software.

Referring to FIG. 4, one or more data-local processor nodes 405 are designed to enable statistical software operations using either a high performance computing (HPC) with message passing interface (MPI) and/or many-task computing (MTC) with a Map Reduce (MR) programming or computational model. Each of the nodes 405 is equipped with a combination of a mid-range multi-core CPU 406, one or more coprocessor cards 409, and RAM 408 for computation on data local to the corresponding node 405. Each of the nodes 405 is also equipped to facilitate the execution of semantic classification software. An example of statistical software is "R" and an example of semantic classification software is Apache™ Stanbol™.

The data-local processor nodes 405 are further designed to enable software-defined network (SDN) connectivity in support of computational capabilities. Network connectivity management and operation with the SDN can provide a more effective means for enabling both programming and/or computational models to operate on the same set of nodes within the web-scale grid. In some embodiments, computation can be orchestrated with corresponding client software on a client workstation. Further, statistical programs and ontologies can be deployed from this client workstation.

According to embodiments, the web-scale data-local processor implementation 400 can utilize a combination of high-performance computing (HPC) and many-task computing (MTC) facilitated by SDN, the one or more coprocessor cards 409, and/or data locality based-computation with direct-attached storage (DAS). As discussed herein, the CPU 406 can be used in combination with the one or more coprocessor cards 409 for horizontal and vertical scaling to provide distributed parallel computation. Similarly, the web-scale Grid can facilitate storage using both DAS and RAM, whereby the combination of the one or more coprocessors 409 and the storage enables the Grid to achieve web-scale. Further, the use of RAM as a cache of DAS can enable data-local computation.

Section 5

Web-Scale Information Retrieval

Figure 5:
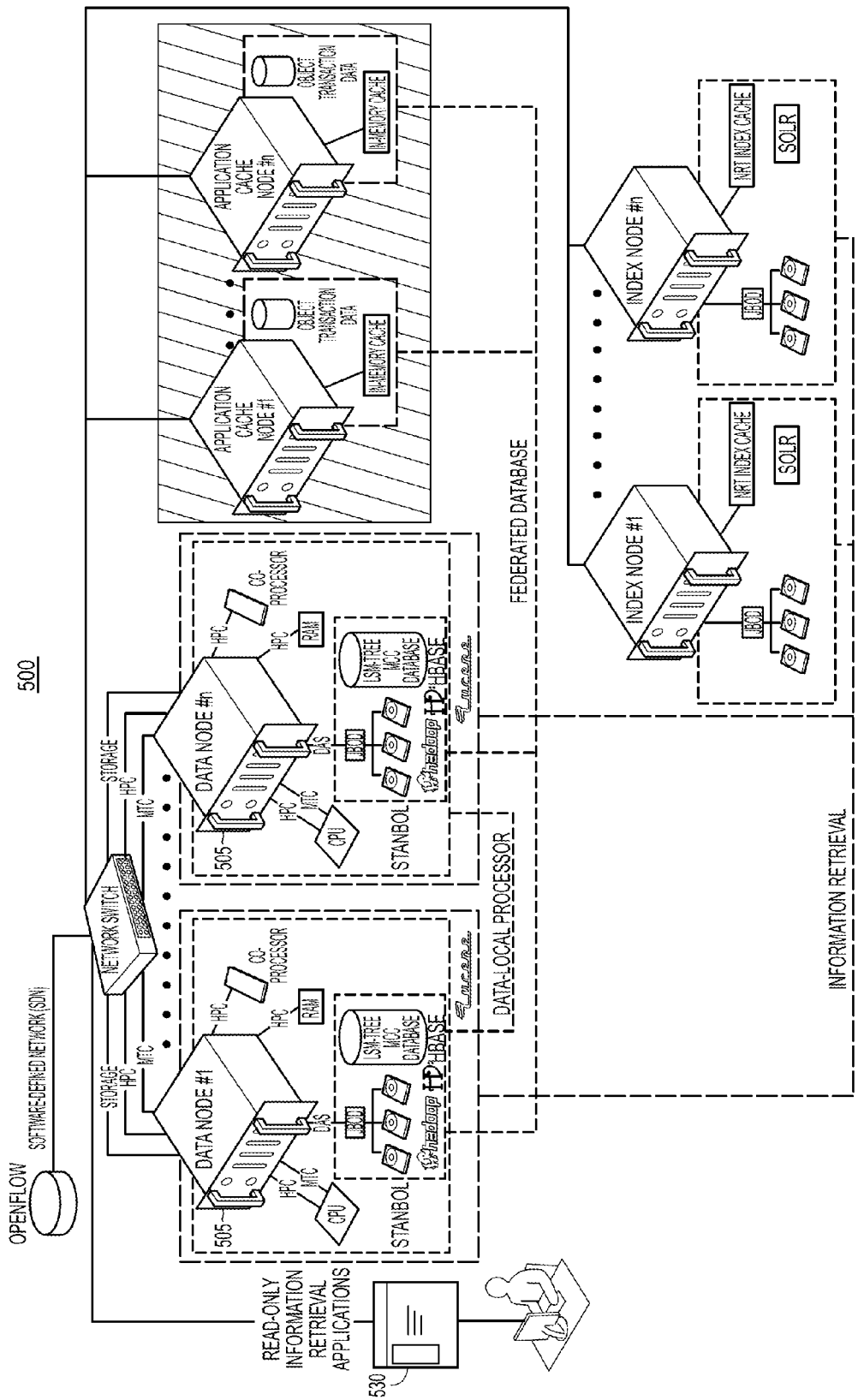
FIG. 5 is a block diagram of an exemplary web-scale data fabric system on which a web-scale information retrieval method may operate in accordance with some embodiments.

Referring now to FIG. 5, a web-scale information retrieval implementation 500 positions the web-scale federated database (as discussed with respect to Section 2) for content management of multi-structured data along with the web-scale data-local processor (as discussed with respect to Section 4) to facilitate content classification and indexing. In some embodiments, the information retrieval implementation 500 can address index processing using the Apache™ Lucene™ software operating with a data-local processor. In some cases, content processed by the information retrieval implementation 500 can be ingested through the web-scale stream processor (as discussed with respect to Section 3). As shown in FIG. 5, portions of the implementation 500 may be facilitated by one or more information retrieval applications 530.

The information retrieval implementation 500 can be designed to index content incrementally as it is stored on the federated database. Access to indexes for search queries can be enabled through additional nodes that extend the web-scale grid with an additional cluster. Generated index files can be copied to this search cluster and managed periodically. For low latency indexing applications, content can be indexed on insert into the federated database, while the index cluster is updated.

According to embodiments, the generated index can reference content in the federated database. Search query results can include content descriptions along with a key for retrieval of content from the federated database. This content key can be the basis for retrieval of data from the federated database.

The index cluster can process queries using, for example, the SolrCloud™ software. Each node 505 can contain index replicas and can be designed and configured to operate with high availability. In some embodiments, the number of nodes in the index cluster can be relative to the extent of search queries and volume of users.

According to embodiments, each data center can include the described layout of index and search functionalities. The combined deployment across data centers for information retrieval can provide availability resilience in disaster situations affecting an entire data center. The design and configuration of the information retrieval implementation 500 can provide low latency indexing and search across all multi-structured data and content. Further, the design and configuration of the information retrieval implementation can provide the basis for search-based applications (SBA) to address development of both operational and analytic applications.

Section 6

Web-Scale Master Data Management

Figure 6:
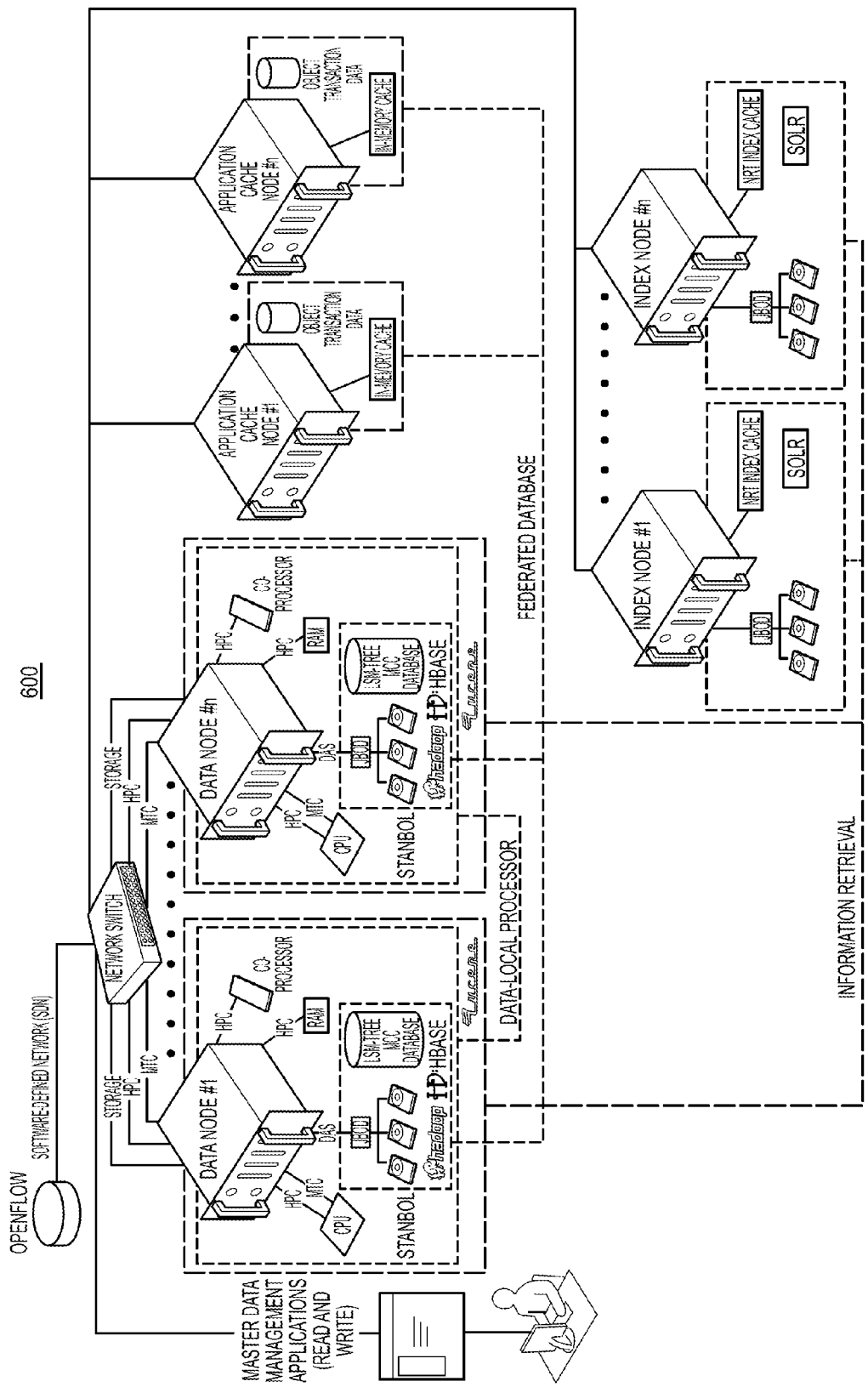
FIG. 6 is a block diagram of an exemplary web-scale master data management system on which a web-scale master data management method may operate in accordance with some embodiments.

Referring now to FIG. 6, a data management implementation 600 includes the web-scale grid (as discussed with respect to Section 1), the web-scale federated database (as discussed with respect to Section 2), the web-scale stream processor (as discussed with respect to Section 3), the web-scale data-local processor (as discussed with respect to Section 4), and the web-scale information retrieval (as discussed with respect to Section 5). According to embodiments, the data management implementation 600 can facilitate the collection and processing of data at extreme scale despite variety, velocity, and/or volume at a high-availability and/or disaster-recovery service level. To build business capability with the data management implementation 600, the data can be arranged and architected for management by the corresponding business, an architecture practice generally referred to as master data management. Accordingly, in some cases, the Web-Scale master data management implementation 600 can be the data architecture atop the web-scale platform.

In embodiments, data can be arranged according to its source within the federated database and, through the use of multi-version concurrency control (MCC) data design, can contain a log or history of known changes. Because information retrieval indexing can be designed to span numerous types of data, including history, and regardless of source, data can be easily accessed via a search.

In order to enable transactions executed in the conduct of business, the acquisition of contextual reference data may be advantageous. For example, an insurance claim may reference the primary named insured, claimant, vehicle, peril, and/or the policy. In some embodiments, search can be the method for acquiring the required reference data for transactions.

According to embodiments, assessing the quality of master data is integral to the management of the data. In particular, faceted search can be the vehicle for identifying duplicate data occurrences as well as examining spelling variances that may affect data quality. The master data management implementation 600 can provide the architecture needed to map all ingested data with corresponding search indexes. In particular, the master data management implementation 600 can utilize search-based master data retrieval across various multi-structured data. Additionally, the master data management implementation 600 can utilize classification enabled with facets to provide metrics for data quality assessments.

Section 7

Web-Scale Analytics

Figure 7:
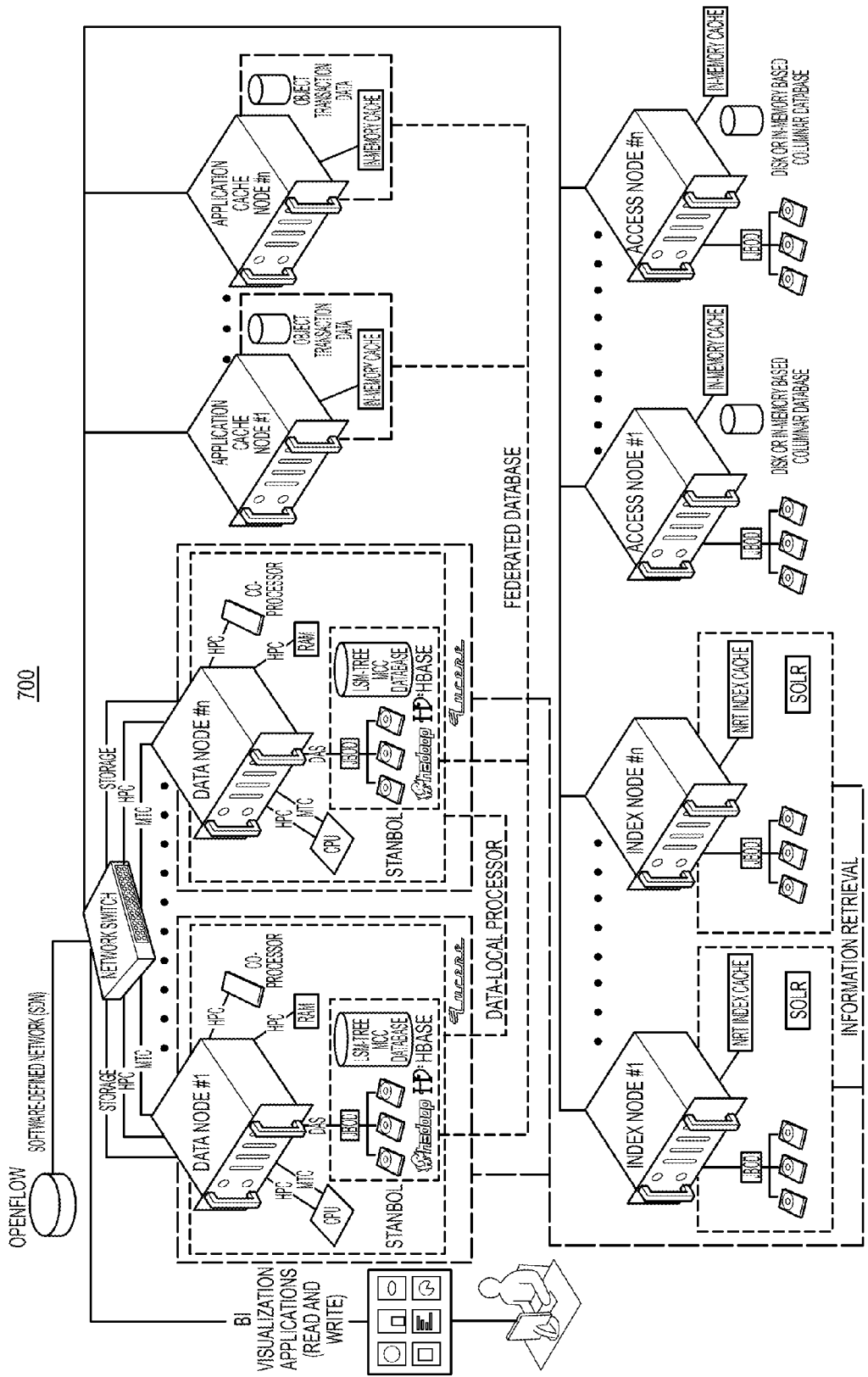
FIG. 7 is a block diagram of an exemplary web-scale data fabric system on which a web-scale analytics method may operate in accordance with some embodiments.

Referring now to FIG. 7, a web-scale analytics implementation 700 builds on the web-scale grid (as discussed with respect to Section 1), the web-scale federated database (as discussed with respect to Section 2), the web-scale stream processor (as discussed with respect to Section 3), the web-scale data-local processor (as discussed with respect to Section 4), the web-scale information retrieval (as discussed with respect to Section 5), and the web-scale master data management (as discussed with respect to Section 6). The web-scale analytics implementation 700 can leverage the stream processor and/or the data-local processor to compute aggregates, depending on latency requirements. In particular, aggregates that are routinely used can be periodically pre-computed and stored in the federated database for shared access. These pre-computed aggregates can also be indexed and accessed through information retrieval and/or correlated with master data using master data management. On-the-fly aggregates can depend on grid memory and coprocessors for computation, as well as speed-through concurrency, data locality, and/or computation as data is in-flight.

The web-scale analytics implementation 700 can be designed for consumption through interactive visualizations. These visualizations can be generated using business intelligence (BI) tools. In some embodiments, BI tools can be hosted on a number of nodes that extend the grid. These BI tools can also be designed and configured to provide self-service (i.e., user-defined) function-to-data aggregate processing using the data-local processor.

According to embodiments, pre-computed aggregates can also be designed for transfer and storage to a columnar store. In some cases, columnar storage can provide economy-of-scale and can be well-suited for speed-of-thought analytics. This columnar store can be positioned for the interim to provide continuity for BI tools that operate with SQL. It should be appreciated that equivalent speed-of-thought analytics for use within the federated database are envisioned. A nested columnar data representation within the federated database can be positioned as the replacement for a columnar store.

According to embodiments, the web-scale analytics implementation 700 can utilize stream processing and data-local processing to compute data aggregations, and can choose the optimal processing method based on latency requirements. In particular, the web-scale analytics implementation 700 can enable self-service (i.e., user-defined) data-local processing for analytics. Further, the web-scale analytics implementation 700 can store pre-computed aggregates in a columnar store for continuity with current business intelligence (BI) tools, as well as provide speed-of-thought interactive visualizations at an economy-of-scale.

Section 8

Web-Scale Search-Based Application

Figure 8:
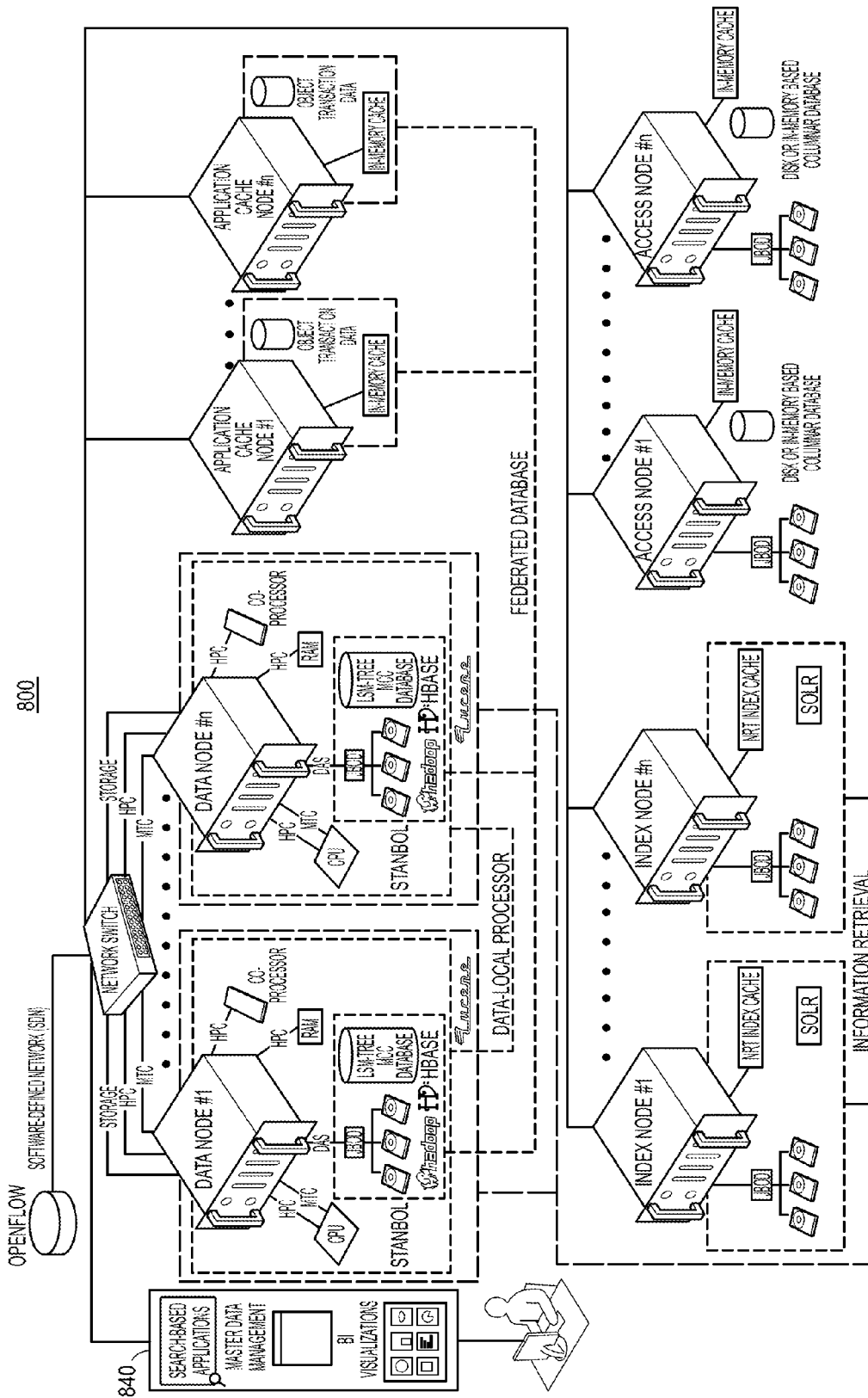
FIG. 8 is a block diagram of an exemplary web-scale data fabric system on which a web-scale search-based application method may operate in accordance with some embodiments.

Referring now to FIG. 8, illustrated is a web-scale search-based implementation 800 that can include the web-scale grid (as discussed with respect to Section 1), the web-scale federated database (as discussed with respect to Section 2), the web-scale stream processor (as discussed with respect to Section 3), the web-scale data-local processor (as discussed with respect to Section 4), the web-scale information retrieval (as discussed with respect to Section 5), the web-scale master data management (as discussed with respect to Section 6), and the web-scale analytics (as discussed with respect to Section 7). According to embodiments, the web-scale search-based implementation 800 can be used to build both operational and analytic applications. The type of applications which best utilizes the web-scale search-based implementation 800 can be referred to as a web-scale search-based application 840.

Search functionality can add another dimension to the design of these web-scale search-based applications, particularly with the build for master data management as well as the basis for navigating analytics. In some embodiments, the design for search-based applications can leverage information retrieval functionalities.

Some applications that are operational for processing transactions and/or facilitating applications used for analytics can be addressed through a search-based application design. This combination is distinct from other search-based design applications that are primarily analytical. The search-based implementation 800 is also unique in that it includes the data-local processor and stream processor for generating analytics whereas existing designs rely on analytics provided by a search engine and/or an analytic tool that moves data-to-function.

The search-based application 840 can be developed using information retrieval and analytics graphic user interface (GUI) components. These GUI components are enabled with software development kits. The assembled GUI can be a mash-up of visualizations from analytics and facetted navigation from information retrieval.

The same features noted for master data management are applicable with the search-based application 840. In particular, lookup functionalities of reference data to associate with a transaction may be expected for operational applications. Further, visualization of data quality metrics for master data may be expected to include integration with analytics.

According to embodiments, the search-based application 840 may integrate analytic computations such as scoring an insurance claim for potential special investigation, displaying a targeted advertisement, and/or other functionalities. Development of these analytic computations applied with the data-local processor and stream processor can take advantage of distributed parallel or concurrent computing with data locality or function-to-data processing. This development approach may leverage either a high performance computing (HPC) with message passing interface (MPI) and/or many-task computing (MTC) with the Map Reduce (MR) programming/computational model.

When deployed, the GUI components of the search-based application 840 can leverage an extension to the Grid. The extension includes a set of nodes that host the application on containers within web application servers. These web application servers can be designed and configured to take advantage of in-memory cache for managing web sessions and to provide high availability across the data centers.

The search-based application 840 can include various applications to use the data storage, ingestion, and analysis systems and methods discussed herein to enable a user to perform and/or automate various tasks. For example, it may be advantageous to use a web-scale search-based application to assist with filling out and/or verifying insurance claims.

According to embodiments, the search-based application 840 can be configured to fill out an insurance claim and may also leverage the techniques discussed herein to streamline the process of filling out an insurance claim. For example, if a hail storm occurs in Bloomington, Ill. on May 3, various news stories, posts on social networks, blog posts, etc. will likely be written about the storm. These stories and posts may be directly on point (e.g., "A hailstorm occurred in Bloomington today") or may indirectly refer to the storm (e.g., "My car windshield is broken #bummer"). Using the techniques discussed above, these stories, posts, and data may be identified and analyzed using complex event processing (CEP) to determine whether a storm occurred over a particular area and/or whether the storm was severe enough to cause damage. For example, analytics may determine whether the "Bloomington" of the first post refers to Bloomington, Ill. or Bloomington, Ind. by determining whether words and metadata (e.g., IP address) associated with the post are more proximate to Illinois or Indiana. Additionally, if multiple posts and stories discuss damage to property in a timeframe on or shortly after May 3, analytics may be used to estimate the likelihood and extent of damage. Further, the originally unstructured and semi-structure data from these posts and stories that have been ingested with the web-scale stream processor (as discussed with respect to Section 3) may be analyzed with structured data (e.g., telematics data, information from insurance claims, etc).

Accordingly, when example customer John Smith begins to fill out an insurance claim, a web-scale search-based application 840 that is configured to fill out an insurance claim may compare information from these analytics to information associated with John Smith (e.g., his Bloomington, Ill. home address, the telematics data from his truck indicating that multiple sharp forces occurred at the front of the vehicle, and/or other data) to determine that the insurance claim likely relates to hail damage and to automatically populate the fields in an insurance form associated with the claim and relating to cause and extent of damage. Similarly, a web-scale search-based application that is configured to verify claims can determine whether a cause and/or an extent of damage (or other aspects of an insurance claim) are within a likely range based on analysis of structured, semi-structured, and unstructured data using the WSDF.

It should be appreciated that web-scale search-based applications can address development of both operational and analytic applications. In particular, web-scale search-based applications can utilize search-based master data retrieval for transactional reference data. Further, web-scale search-based applications can utilize facetted navigation of multi-structured data with information retrieval. Additionally, the web-scale search-based applications can combine stream processing and data-local processing for aggregation, depending on latency requirements.

Section 9

Web-Scale Data Fabric Use Case

Figure 9:
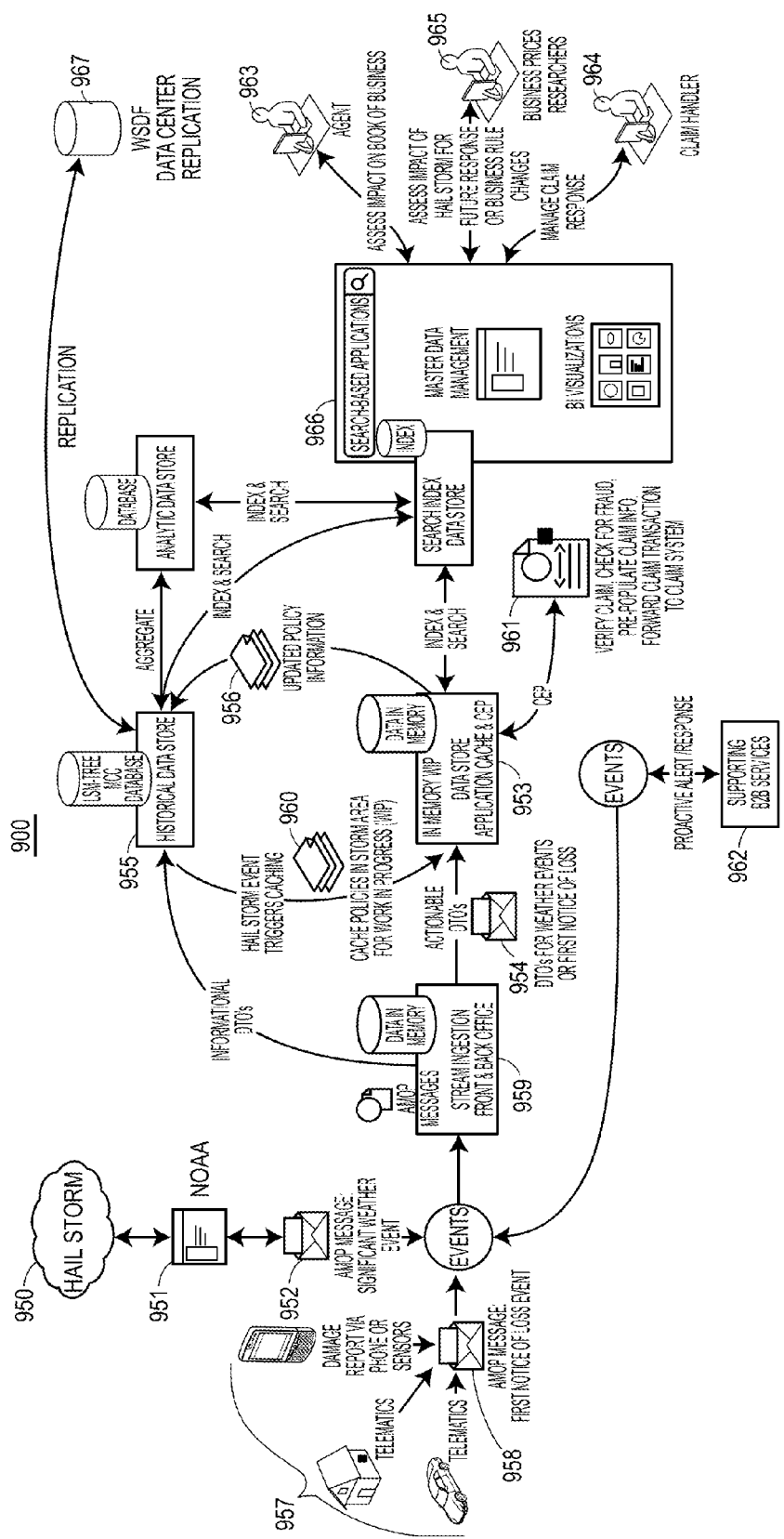
FIG. 9 illustrates an exemplary use case for processing insurance data in accordance with some embodiments.

Referring now to FIG. 9, an example use case 900 described in this section will serve to provide a more detailed example of how the unique capabilities of the WSDF architecture may be used to enable the company or business to be more competitive, such as by streamlining insurance data initiation and processing. According to embodiments, the use case 900 described herein can be a subset of a larger use case originally designed for both business consumption (e.g., insurance operations) and to manage the infrastructure (e.g., IT systems operational) of the WSDF. In some embodiments, the use case 900 can be designed using a concept known as visual interactive intelligent infrastructure (VI3). The remainder of this disclosure will refer to the use case 900 as VI3-B, with the "B" suffix being used to emphasize the business consumption aspect of the use case 900. It should be appreciated that the use case 900 may be designed using other techniques or concepts.

The business competitive advantage of VI3-B is the ability to prepopulate information in forms for a potential insurance claim based upon either a machine- or customer-generated event notification, as well as perform post-processing analytics. In embodiments, having potential insurance information prepopulated saves both the insurance customer and the insurance provider from the time burden of manually entering information to activate a claim. Another advantage of VI3-B is the ability to provide proactive notification to business-to-business (B2B) services of the potential impact to their businesses should the event trigger be related to a mega-claim type of event.

The example use case 900 scenario starts with a significant hail storm 950, triggering an event notification received from a streamed feed by the National Oceanic and Atmospheric Administration (NOAA) 951. The event notification is ingested as an AMQP message 952 and interpreted as an actionable event. The AMQP message 952 is sent as a DTO 954 to an in memory data store for work-in-process (WIP) 953. Complex event processing (CEP) of the memory data store 953 can use a continuous query capability to identify the actionable event as a trigger to request that all (or some) current policy holder information within the geographical area of the hail storm be transferred from a historical data store 955 (e.g., LSM-tree and MCC database) to the in memory WIP data store 953 as a cached data object 960. Once the data object has been cached, the WIP data store 953 can initiate pre-population for a potential claim submission and store the potential claim submission in cache. In embodiments, this transfer of data from the historical data store 955 to the in memory WIP data store 953 may be efficiently managed through operational policies defined to manage the software defined network (SDN).

Referring to the example use case 900 of FIG. 9, damage from the hail storm to autos, homes or other items 957 covered for the customers (i.e., policy holders) may also trigger a first notice of loss (FNOL) event 958 through, for example, automatic sensor-based detection or from a customer contact received about a loss from the hail storm. The customer contact may be an email, text message, photo, video, phone call, and/or the like. The FNOL is ingested by a stream ingestion component 959 as an AMQP message and interpreted as an actionable event. The AMQP message is sent as a DTO (954) to the in memory WIP data store 953. The CEP of the in memory WIP data store 953 can identify this actionable event as a trigger to attempt to match the FNOL information to one of the cached policies 960. In some embodiments, data from additional entities 962 such as various business-to-business supporting services may also provide information related to various events that may necessitate insurance claim processing. The in memory WIP data store 953 may process the data from additional entities 962 and match the data to one or more of the cached policies 960.

Assuming the FNOL is matched (for example using a GUID) to a valid one of the cached policies 960, the prepopulated object transaction is updated to reflect the receipt of FNOL and to submit a transaction to a claim system (as illustrated by 961).

As information related to the hail storm is continuously stream processed by the message broker into distributed cache of the in memory WIP data store 953, the information is further enriched for information retrieval through low-latency indexing and semantic processing to allow the information to be searched and analyzed in near real-time and with proper context. In some embodiments, the near real-time indexing and searching capabilities in the WSDF can be enabled by using Lucene™/Solr™ and/or coprocessors.

Once the data is enriched, various end users from various groups such as agency 963, claims 964, and/or business process researchers 965 may use the search based application 966 to gain further insight into insurance policies and the processing and/or initiation thereof. For example, the agent 963 may want to query how the hail storm may be impacting his or her book of business. For further example, the claim handler 964 may want to query to assess the storm's impact on financial reserves or estimate (e.g., using historical and analytical data stores) the number of claim handlers needed to manage a response to a large or mega claim event. Further, for example, business process researchers 965 may want to assess how well claims were processed from the FNOL event to claim close.

Additionally, in the event of a mega claim, the loss data that is collected from the storm could be used to assist various B2B services to prepare them for better servicing policy holders to recover from losses.

In embodiments, the master data management (MDM) capabilities can be used to ensure data integrity and consistency of policy holder data cached as a result of the hail storm event, for example by updating in the in memory WIP data store 953 and writing back updated policy information 956 to the historical data store 955. Further, multi-version concurrency control (MCC) can be used to ensure the consistency of the historical data store 955, whereby this same level of integrity and consistency is replicated between a WSDF data center replica entity 967.

The technical capabilities of WSDF can provide the insurance provider with an opportunity to act upon information in near real-time as the data is ingested and indexed. In particular, being able to make business decisions as events unfold can provide a competitive advantage for serving both customers as well as optimizing business operations. Additionally, having a rich archive of information can provide the insurance provider with an opportunity to explore how events correlate with other business events. This ability to explore historical data in detail will provide for better business modeling, forecasting, and development of business rules that may be implemented to optimize business operations. The opportunity is not just limited to claim operations as in this use case, but all aspects of the business involved in customer sales, service, retention, and business auditing and compliance.

Figure 10A:
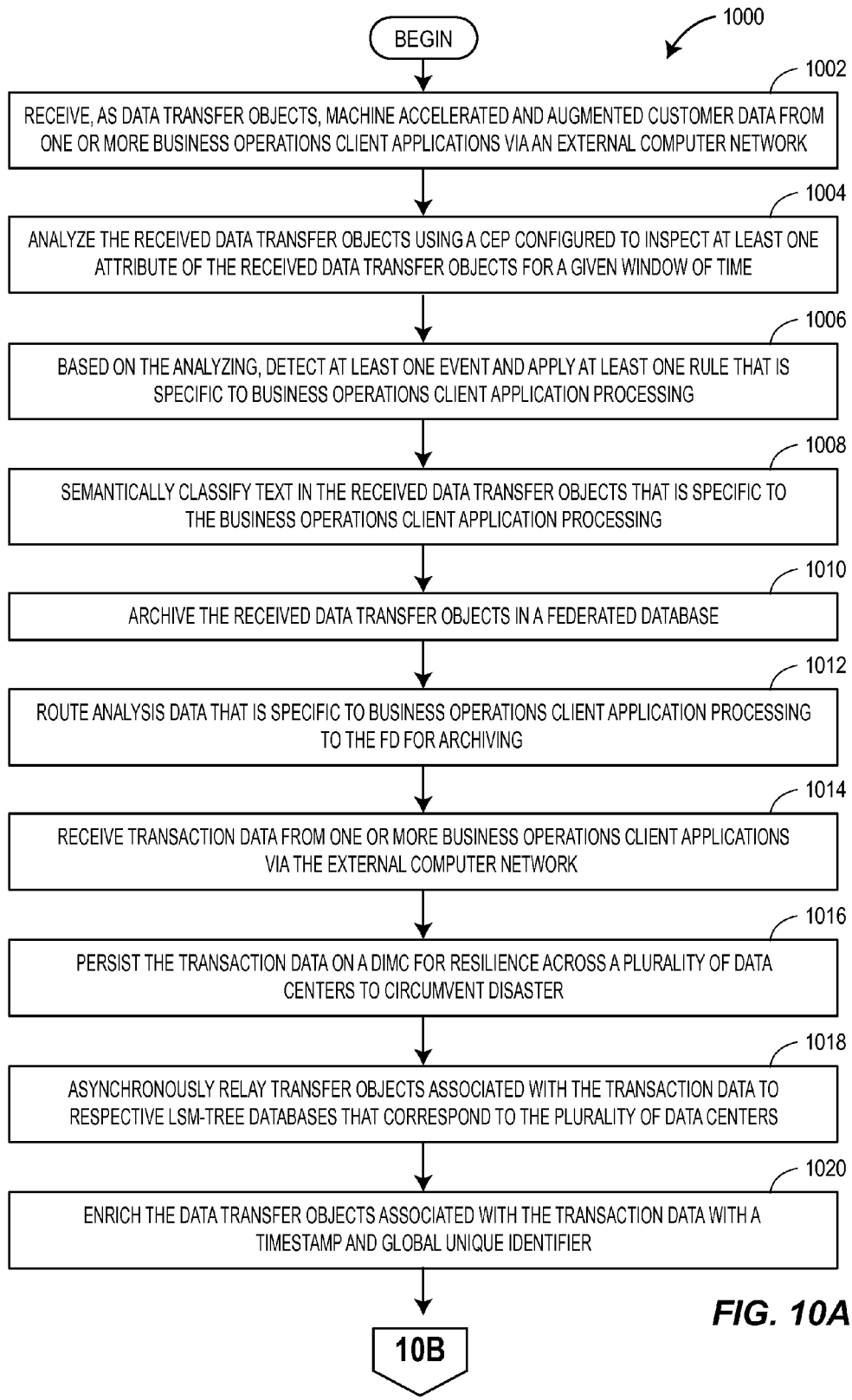
FIGS. 10A-10C depict a flow diagram illustrating an exemplary method of processing machine accelerated and augmented customer data in accordance with some embodiments.
Figure 10B:
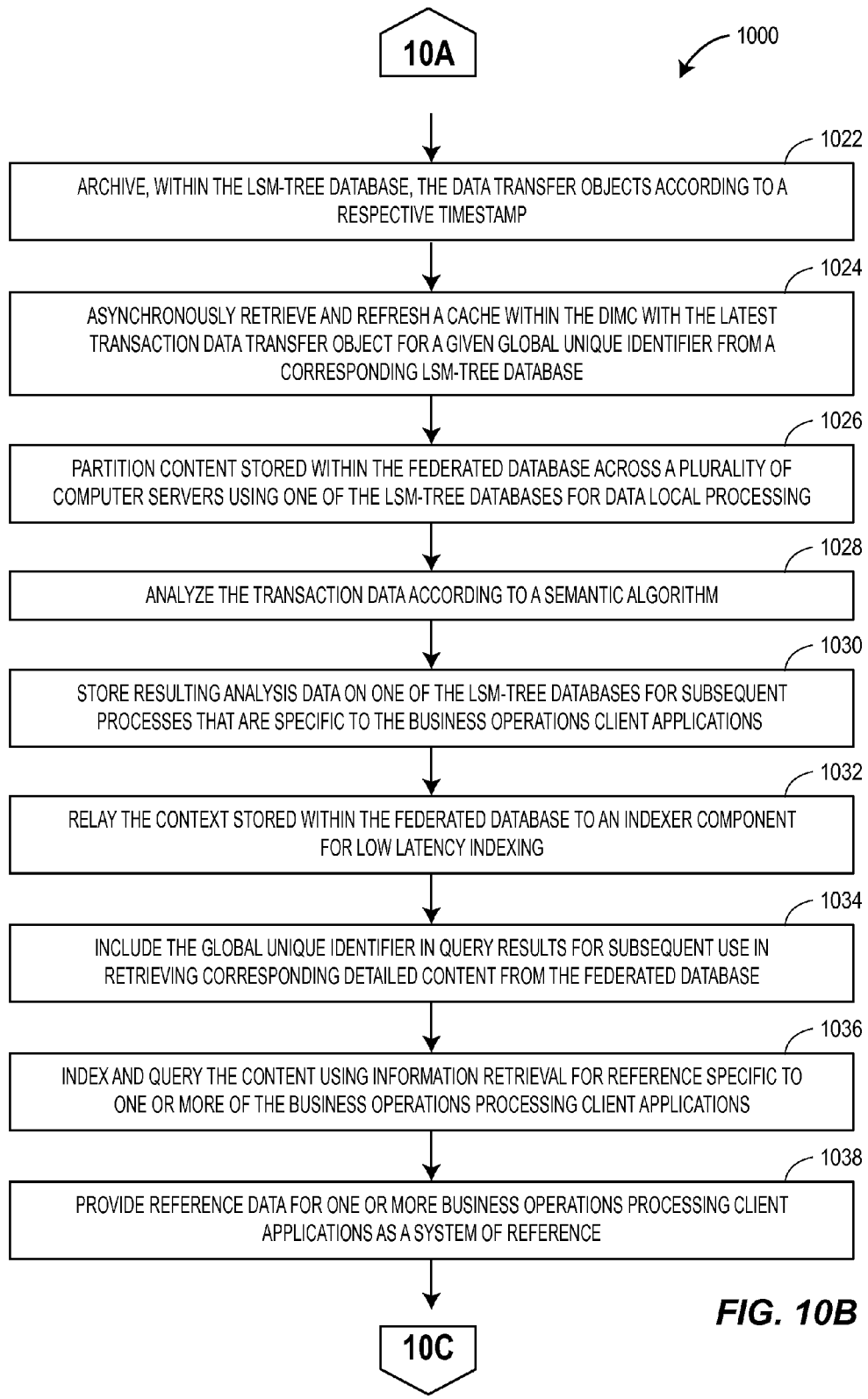
Figure 10C:
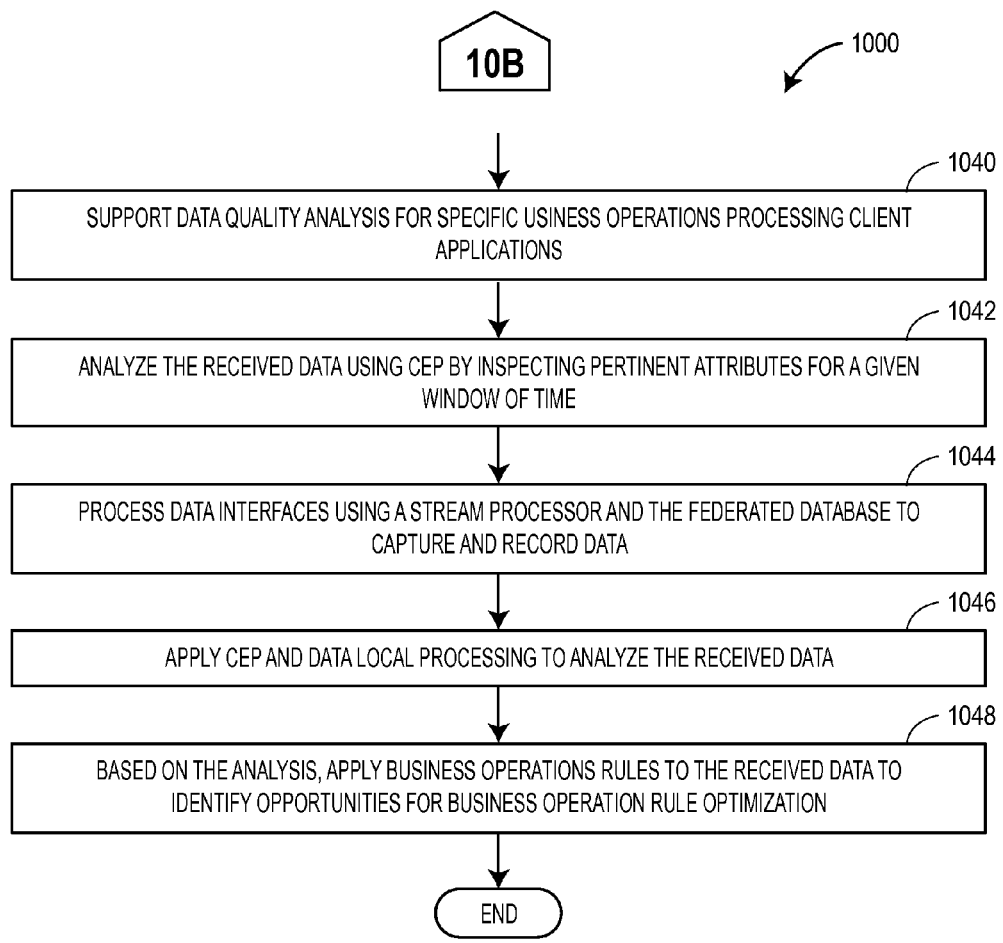

FIG. 10A-10C depict an example method 1000 for processing machine accelerated and augmented customer data. At least a portion of the method 1000 may be performed by one or more computing devices, in an embodiment, such as any combination of the computing devices as described with respect to FIGS. 1-9.

The computing device can receive (block 1002), as data transfer objects, machine accelerated and augmented customer data from one or more business operations client applications via an external computer network, wherein the data transfer objects are (1) received by a message broker component and (2) implemented as an AMQP message with a data transfer object as a payload. The computing device can analyze (block 1004) the received data transfer objects using a complex event processor (CEP) configured to inspect at least one attribute of the received data transfer objects for a given window of time. Based on the analysis, the computing device can detect (block 1006) at least one event and apply at least one rule that is specific to business operations client application processing.

The computing device can semantically classify (block 1008) text in the received data transfer objects that is specific to the business operations client application processing. The computing device can archive (block 1010) the received data transfer objects in a federated database (FD). The computing device can route (block 1012) analysis data that is specific to the business operations client application processing to the FD for archiving. The computing device can receive (block 1014) transaction data from the one or more business operations client applications via the external computer network. The computing device can persist (block 1016) the transaction data on a distributed in-memory cache (DIMC) for resilience across a plurality of data centers to circumvent disaster.

The computing device can asynchronously relay (block 1018) data transfer objects associated with the transaction data to respective log-structured merge tree (LSM-Tree) databases that correspond to the plurality of data centers. The computing device can enrich (block 1020) the data transfer objects associated with the transaction data with a timestamp and global unique identifier. The computing device can archive (block 1022), within the LSM-Tree database, the data transfer objects according to a respective timestamp. The computing device can asynchronously retrieve and refresh (block 1024) a cache within the DIMC with the latest transaction data transfer object for a given global unique identifier from a corresponding LSM-Tree database.

The computing device can partition (block 1026) content stored within the federated database (FD) across a plurality of computer servers using one of the LSM-Tree databases for data local processing. The computing device can analyze (block 1028) the transaction data according to a semantic algorithm. The computing device can store (block 1030) resulting analysis data on one of the LSM-Tree databases for subsequent processes that are specific to the business operations client applications. The computing device can relay (block 1032) the content stored within the FD to an indexer component for low latency indexing, wherein the indexer component avails the relayed content for online querying by creating indexes that are configured for online querying, wherein the indexes reference content within the FD based on a global unique identifier and a timestamp used by the FD, and wherein the indexes are configured to support specific of the business operations client applications. The computing device can include (block 1034) the global unique identifier in query results for subsequent use in retrieving corresponding detailed content from the FD.

The computing device can index and query (block 1036) the content using information retrieval for reference specific to one or more of the business operations processing client applications. The computing device can provide (block 1038)

reference data for the one or more business operations processing client applications as systems of reference. The computing device can support (block 1040) data quality analysis for specific business operations processing client applications.

The computing device can analyze (block 1042) analyze the received data using complex event processing (CEP) by inspecting pertinent attributes for a given window of time to detect events specific to one or more of the business operations client applications. The computing device can process (block 1044) data interfaces using a stream processor and the FD to capture and record data. The computing device can apply (block 1046) CEP and data local processing to analyze the received data. Based on the analysis, the computing device can apply (block 1048) business operations rules to the received data to identify opportunities for business operation rule optimization.

Figure 11:
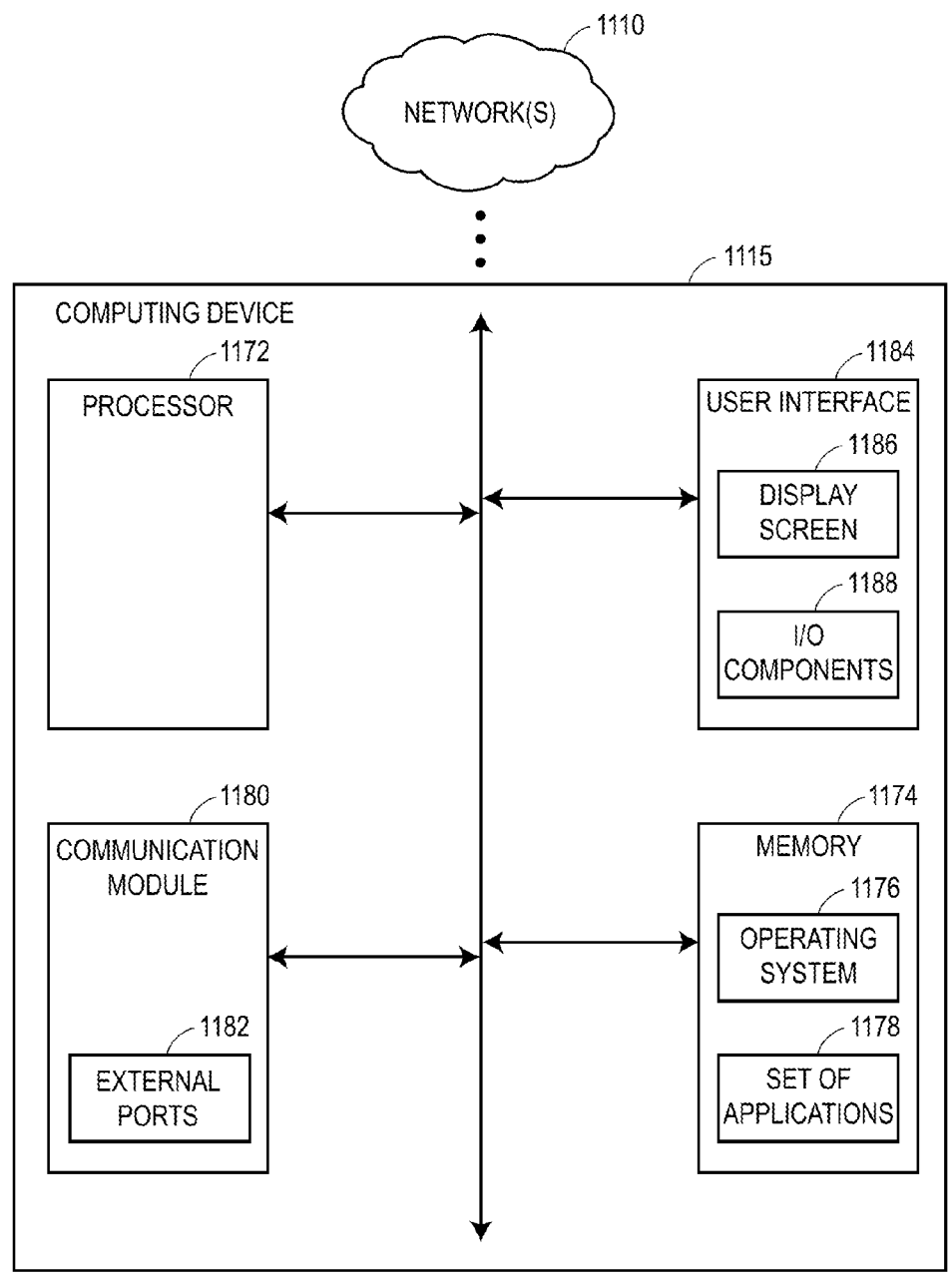
FIG. 11 is a block diagram of a computing device in accordance with some embodiments.

FIG. 11 illustrates an example computing device 1115 (such as the stream ingestion component 959 and/or the in memory WIP data store 953 as described with respect to FIG. 9) in which the functionalities as discussed herein may be implemented. The computing device 1115 can include a processor 1172 as well as a memory 1174. The memory 1174 can store an operating system 1176 capable of facilitating the functionalities as discussed herein as well as a set of applications 1178. For example, one of the set of applications 1178 can be the search based application 966 as described with respect to FIG. 9. The processor 1172 can interface with the memory 1174 to execute the operating system 1176 and the set of applications 1178. According to embodiments, the memory 1174 can also store data associated with insurance policies, any received telematics data or event data, and/or other data. The memory 1174 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), cache memory, and/or other hard drives, flash memory, MicroSD cards, and others.

The computing device 1115 can further include a communication module 1180 configured to communicate data via one or more networks 1110. According to some embodiments, the communication module 1180 can include one or more transceivers (e.g., WWAN, WLAN, and/or WPAN transceivers) functioning in accordance with IEEE standards, 3GPP standards, or other standards, and configured to receive and transmit data via one or more external ports 1182. For example, the communication module 1180 can receive telematics data from one or more vehicles via the network 1110 and can receive any supplemental data or relevant data associated with driving tip models from a third party entity or component. For further example, the computing device 1115 can transmit driving tips to vehicles via the communication module 1180 and the network(s) 1110. The computing device 1115 may further include a user interface 1184 configured to present information to a user and/or receive inputs from the user. As shown in FIG. 11, the user interface 1184 includes a display screen 1186 and I/O components 1188 (e.g., ports, capacitive or resistive touch sensitive input panels, keys, buttons, lights, LEDs, speakers, microphones, and others). According to embodiments, the user may access the computing device 1115 via the user interface 1184 to examine ingested data, examine processed insurance claims, and/or perform other functions.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 1172 (e.g., working in connection with the operating system 1176) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and systems described herein are illustrative only and are not limiting upon the scope of the claims.

GLOSSARY

Advanced Messaging Queuing Protocol (AMQP) is an open standard protocol for messaging middleware.

Commodity Computing refers to components based on open standards and provided by several manufacturers with little differentiation.

Complex Event Processing (CEP) occurs when data from a combination of sources is assessed to determine an event.

Content Management System (CMS) is the store for all multi-structured data.

Continuous Query refers to a means of actively applying rules to data changes, often in support of Complex Event Processing (CEP).

Coprocessor supplements the function of the CPU in a general purpose context.

Direct Attached Storage (DAS) refers to a digital storage device (e.g., hard disk) that is directly connected (no network device) to a host.

Distributed Cache refers to both the means of caching data in transit to (write) and from (read) the database across a grid of servers, as well as the ability of such a scheme to address high-availability.

Distributed Operating System refers to software that manages the computing resources and provides common services where each node hosts a subset of the global aggregate operating system.

Globally Unique Identifier (GUID) is a global unique identifier used to identify Objects.

High-Availability (HA) Grid or Cluster refers to a group of computers that operate by providing reliable hosting of applications with graceful degradation and/or upgrade due to component failure or addition, respectively, but not at the expense of availability. Availability is defined as the means to submit additional processing or manage existing processing.

Hadoop® Distributed File System (HDFS) is a component of the Hadoop® framework that manages storage of files in a fault tolerant and distributed fashion using replicated blocks across a set of data nodes.

Hadoop® Yet Another Resource Manager (YARN) is a component of the Hadoop® framework that manages computing resources on the set of data nodes which are also used for computation.

High Performance Computing (HPC) is characterized as needing large amounts of computing power over short periods of time, often expressed with tightly coupled low latency interconnects such as the Message Passing Interface (MPI).

Information Retrieval refers to inverted indexing and query of multi-structured data.

Linux is the operating system used to manage a node and its computational and file storage resources.

Log-Structured Merge Tree (LSM-tree) database is a high throughput optimized datastore.

Low Latency refers to a network computing delay that is generally accepted as imperceptible by humans.

Many-Task Computing (MTC) is geared toward addressing high-performance computations comprised of multiple distinct activities integrated via a file system.

Master Data Management (MDM) refers to the governance and polices used to manage reference data that is key to the operation of a business.

Message Broker is used for enabling enterprise integration patterns used to integrate systems.

Multi-Structured data refers to an all-inclusive set of structured, semi-structured, and un-structured data.

Multi-Version Concurrency Control (MCC) is a method used by databases to implement transaction history.

Object Transaction refers to a unit of work for any data change to an Object attribute recorded by the database.

Ontology is a set of semantic metadata from which unstructured data classification is based.

OpenFlow enables network connectivity using a communication protocol through a switch path determined by software.

Software Defined Network (SDN) refers to the data flow between compute nodes in a computer network that is determined by logic implemented in software operating on server(s) separate of the network hardware.

Stream Processing refers to the application of messaging for the purposes of addressing parallel processing of in-flight data used for Complex Event Processing (CEP).

Semantic Processing refers to the ability to bring meaningful search to enterprise search engines through natural language processing and associated content classification based on ontology.

What is claimed:

1. A method of stream processing machine accelerated and augmented customer data, the method comprising:
    receiving, as data transfer objects, machine accelerated and augmented customer data from one or more business operations client applications via an external computer network, wherein the data transfer objects are (1) received by a message broker component and (2) implemented as an advanced message queuing protocol (AMQP) message with a data transfer object as a payload;
    analyzing, by a processor, the received data transfer objects using complex event processing (CEP) configured to inspect at least one attribute of the received data transfer objects for a given window of time;
    based on the analyzing, detecting at least one event and applying at least one rule that is specific to business operations client application processing;
    semantically classifying text in the received data transfer objects that is specific to the business operations client application processing;
    archiving the received data transfer objects in a federated database (FD); and
    routing analysis data that is specific to the business operations client application processing to the FD for archiving.

2. The method of claim 1, further comprising:
    receiving transaction data from the one or more business operations client applications via the external computer network;
    persisting the transaction data on a distributed in-memory cache (DIMC) for resilience across a plurality of data centers to circumvent disaster;
    asynchronously relaying data transfer objects associated with the transaction data to respective log-structured merge tree (LSM-Tree) databases that correspond to the plurality of data centers;
    enriching the data transfer objects associated with the transaction data with a timestamp and global unique identifier; and
    archiving, within the respective LSM-Tree databases, the data transfer objects according to a respective timestamp.

3. The method of claim 2, further comprising:
    asynchronously retrieving and refreshing a cache within the DIMC with the latest transaction data transfer object for a given global unique identifier from a corresponding LSM-Tree database.

4. The method of claim 1, further comprising:
    partitioning content stored within the federated database (FD) across a plurality of computer servers using one of respective log-structured merge tree (LSM-Tree) databases for data local processing;
    analyzing the transaction data according to a semantic algorithm; and
    storing resulting analysis data on one of the LSM-Tree databases for subsequent processes that are specific to the business operations client applications.

5. The method of claim 4, further comprising:
    relaying the content stored within the federated database (FD) to an indexer component for low latency indexing, wherein the indexer component avails the relayed content for online querying by creating indexes that are configured for online querying, wherein the indexes reference content within the FD based on a global unique identifier and a timestamp used by the FD, and wherein the indexes are configured to support specific of the business operations client applications.

6. The method of claim 5, further comprising:
    including the global unique identifier in query results for subsequent use in retrieving corresponding detailed content from the FD.

7. The method of claim 6, further comprising:
    indexing and querying the content using information retrieval for reference specific to one or more of the business operations processing client applications;
    providing reference data for the one or more business operations processing client applications as systems of reference; and
    supporting data quality analysis for specific business operations processing client applications.

8. The method of claim 1, wherein analyzing the received data transfer objects comprises:
    analyzing the received data using complex event processing (CEP) by inspecting pertinent attributes for a given window of time to detect events specific to one or more of the business operations client applications.

9. The method of claim 1, further comprising:
processing data interfaces using a stream processor and the federated database (FD) to capture and record data; and
applying complex event processing (CEP) and data local processing to analyze the received data.

10. The method of claim 9, further comprising:
based on the analysis, applying business operations rules to the received data to identify opportunities for business operation rule optimization.

11. A system for stream processing machine accelerated and augmented customer data, comprising:
a memory adapted to store non-transitory computer executable instructions;
a federated database (FD);
a communication module adapted to communicate with an external computer network; and
a processor adapted to interface with the memory, the FD, and the communication module, wherein the processor is configured to execute the non-transitory computer executable instructions to cause the processor to:
receive, via the communication module as data transfer objects, machine accelerated and augmented customer data from one or more business operations client applications via the external computer network, wherein the data transfer objects are implemented as an advanced message queuing protocol (AMQP) message with a data transfer object as a payload,
analyze the received data transfer objects using complex event processing (CEP) to inspect at least one attribute of the received data transfer objects for a given window of time,
based on the analyzing, detect at least one event and apply at least one rule that is specific to business operations client application processing,
semantically classify text in the received data transfer objects that is specific to the business operations client application processing,
archive the received data transfer objects in the FD, and
rout analysis data that is specific to the business operations client application processing to the FD for archiving.

12. The system of claim 11, further comprising:
a distributed in-memory cache (DIMC);
wherein the processor is further configured to:
receive transaction data from the one or more business operations client applications via the external computer network,
persist the transaction data on the DIMC for resilience across a plurality of data centers to circumvent disaster,
asynchronously relay data transfer objects associated with the transaction data to respective log-structured merge tree (LSM-Tree) databases that correspond to the plurality of data centers,
enrich the data transfer objects associated with the transaction data with a timestamp and global unique identifier, and
archive, within the respective LSM-Tree databases, the data transfer objects according to a respective timestamp.

13. The system of claim 12, wherein the processor is further configured to:
asynchronously retrieve and refresh a cache within the DIMC with the latest transaction data transfer object for a given global unique identifier from a corresponding LSM-Tree database.

14. The system of claim 11, wherein the processor is further configured to:
partition content stored within the federated database (FD) across a plurality of computer servers using one of respective log-structured merge tree (LSM-Tree) databases for data local processing,
analyze the transaction data according to a semantic algorithm, and
store resulting analysis data on one of the respective LSM-Tree databases for subsequent processes that are specific to the business operations client applications.

15. The system of claim 14, further comprising:
an indexer component configured for low latency indexing;
wherein the processor is further configured to:
relay the content stored within the federated database (FD) to the indexer component for low latency indexing, wherein the indexer component avails the relayed content for online querying by creating indexes that are configured for online querying, wherein the indexes reference content within the FD based on a global unique identifier and a timestamp used by the FD, and wherein the indexes are configured to support specific of the business operations client applications.

16. The system of claim 15, wherein the processor is further configured to:
include the global unique identifier in query results for subsequent use in retrieving corresponding detailed content from the FD.

17. The system of claim 16, wherein the processor is further configured to:
index and query the content using information retrieval for reference specific to one or more of the business operations processing client applications,
provide reference data for the one or more business operations processing client applications as systems of reference, and
support data quality analysis for specific business operations processing client applications.

18. The system of claim 11, wherein the processor is further configured to:
analyze the received data using complex event processing (CEP) by inspecting pertinent attributes for a given window of time to detect events specific to one or more of the business operations client applications.

19. The system of claim 11, wherein the processor is further configured to:
process data interfaces using the federated database (FD) to capture and record data, and
apply complex event processing (CEP) and data local processing to analyze the received data.

20. The system of claim 19, wherein the processor is further configured to:
based on the analysis, apply business operations rules to the received data to identify opportunities for business operation rule optimization.

* * * * *